US012701069B2

(12) United States Patent
Guo et al.

(10) Patent No.: US 12,701,069 B2
(45) **Date of Patent: *Aug. 4, 2026**

(54) REQUEST AND RESPONSE METHOD FOR PROBING MLD, STATION, AND ACCESS POINT

(71) Applicant: Huawei Technologies Co., Ltd., Shenzhen (CN)

(72) Inventors: Yuchen Guo, Shenzhen (CN); Ming Gan, Shenzhen (CN); Yunbo Li, Shenzhen (CN); Guogang Huang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 111 days.

This patent is subject to a terminal disclaimer.

(21) Appl. No.: 18/658,433

(22) Filed: May 8, 2024

(65) Prior Publication Data

US 2024/0364612 A1      Oct. 31, 2024

Related U.S. Application Data

(63) Continuation of application No. 18/091,924, filed on Dec. 30, 2022, now Pat. No. 12,003,399, which is a
(Continued)

(30) Foreign Application Priority Data

Jul. 2, 2020      (CN) .......................... 202010634151.8

(51) Int. Cl.
*H04L 43/12* (2022.01)
*H04W 24/02* (2009.01)
*H04W 84/12* (2009.01)

(52) U.S. Cl.
CPC ............. *H04L 43/12* (2013.01); *H04W 24/02* (2013.01); *H04W 84/12* (2013.01)

(58) Field of Classification Search
CPC ........ H04L 43/12; H04W 24/02; H04W 84/12
See application file for complete search history.

(56) References Cited

U.S. PATENT DOCUMENTS 10,237,891 B1      3/2019   Chu et al.
11,228,963 B2      1/2022   Patil et al.
(Continued)

FOREIGN PATENT DOCUMENTS

CN          107205259 A      9/2017
CN          108810879 A      11/2018
(Continued)

OTHER PUBLICATIONS

Edward Au, "Compendium of straw polls and potential changes to the Specification Framework Document", IEEE P802.11 20/0566r35, Jul. 1, 2020, total: 16 pages.
(Continued)

*Primary Examiner* — Mohammad S Anwar
(74) *Attorney, Agent, or Firm* — Slater Matsil, LLP

(57)      ABSTRACT

Embodiments of this application provide a probe request and response technology between a station and a plurality of access point multi-link devices (AP MLDs). During implementation of this application, a station may obtain communication parameters of a plurality of APs of one or more AP MLDs by sending one probe request frame, to obtain communication parameters of the AP MLD on a plurality of links, thereby efficiently implementing association between the station and the AP MLD or establishing multi-link transmission between the station and the AP MLD.

17 Claims, 25 Drawing Sheets

Related U.S. Application Data continuation of application No. PCT/CN2021/104327, filed on Jul. 2, 2021.

(56) References Cited

U.S. PATENT DOCUMENTS

| | | | |
|---|---|---|---|
| 12,003,399 B2 * | 6/2024 | Guo ...................... | H04W 76/15 |
| 2015/0249953 A1 | 9/2015 | Kim et al. | |
| 2016/0007275 A1 | 1/2016 | Park et al. | |
| 2020/0068486 A1 | 2/2020 | Asterjadhi et al. | |
| 2021/0014776 A1 | 1/2021 | Patil et al. | |

FOREIGN PATENT DOCUMENTS

| | | | |
|---|---|---|---|
| EP | 4117381 | A1 | 1/2023 |
| TW | 202110267 | A | 3/2021 |
| WO | 2019140412 | A1 | 7/2019 |
| WO | 2020043433 | A1 | 3/2020 |
| WO | 2022253791 | A1 | 12/2022 |

OTHER PUBLICATIONS

Patil, A. et al., "Container for advertising ML Information", IEEE 802.11-20/0357r2, Mar. 15, 2020, 30 pages.

Abhishek, Patil et al. (Qualcomm), "MLO Discovery Signaling", doc.: IEEE 802.11-20/0356r2, Mar. 15, 2020, XP068169500, pp. 1-16.

Au, Edward (Huawei), "Compendium of straw polls and potential changes to the Specification Framework Document", doc.: IEEE 802.11-20/0566r35, Jul. 1, 2020, XP068170467A, pp. 1-114.

Cariou, Laurent et al., Multi-Link Discovery—part 1, doc.: 20/0389r0, XP055824264, Mar. 15, 2020, 12 pages.

Cariou, L. et al., "Multi-Link Discovery-Part 2", IEEE 802.11-20/0390r0, Feb. 13, 2020, 12 pages.

Cariou, L. et al, "Multi-Link Discovery—Part 2", IEEE 802.11-20/0390r3, Feb. 13, 2020, 14 pages.

Guo, J. et al, "Multi-Link Probe Request Design", IEEE 802.11-20/1396r0, Sep. 14, 2020, 16 pages.

Huang, G. et al, "Multi-link Association Follow Up", IEEE 802.11-20/0030r6, Jan. 10, 2020, 11 pages.

Patil, A. et al, "Multi-BSSID Operation with Mlo", IEEE 802.11-19/0358r3, Mar. 15, 2020, 13 pages.

Patil, A. et al., "Container for advertising ML Information", IEEE 802.11-20/0357r3, Mar. 15, 2020, 30 pages.

Rison, Mark (Samsung), "Review of P802 .11be/DO .3 for CC34", doc.: IEEE 802.11-21/0218r0, XP68178718A, Feb. 11, 2021, pp. 1-46.

* cited by examiner

Multi-link AP device
Multi-link AP device

AP 101                    AP 201

Multi-link non-AP device
Multi-link non-AP STA device

STA 102                   STA 202

REQUEST AND RESPONSE METHOD FOR PROBING MLD, STATION, AND ACCESS POINT

CROSS-REFERENCE TO RELATED APPLICATIONS

This application is a continuation of U.S. patent application Ser. No. 18/091,924, filed on Dec. 30, 2022, which is a continuation of International Application No. PCT/CN2021/104327, filed on Jul. 2, 2021. The International Application claims priority to Chinese Patent Application No. 202010634151.8, filed on Jul. 2, 2020. All of the aforementioned patent applications are hereby incorporated by reference in their entireties.

TECHNICAL FIELD

This application relates to the field of communication technologies, and in particular, to request and response methods for probing an MLD in a wireless local area network, a station, and an access point.

BACKGROUND

To greatly increase a service transmission rate of a wireless local area network (WLAN) system, an orthogonal frequency division multiple access (OFDMA) technology is further used in the Institute of Electrical and Electronics Engineers (IEEE) 802.11ax standard based on an existing orthogonal frequency division multiplexing (OFDM) technology. The OFDMA technology supports a plurality of nodes to simultaneously send and receive data, to achieve multi-station diversity gains. In 2017 when the 802.11ax standard is finalized, the Federal Communications Commission (FCC) of the United States released a new free frequency band 5925-7125 MHz, which is referred to as 6 GHz in the following. In this case, 802.11ax standard workers expand an operating range of 802.11ax-compliant devices from 2.4 GHz and 5 GHz to 2.4 GHz, 5 GHZ, and 6 GHz in the 802.11ax project authorization request (PAR).

IEEE 802.11 next-generation Wi-Fi protocol (EHT) devices need to be forward compatible. Therefore, they also support operating spectrums of 802.11ax-compliant devices, that is, 2.4 GHz, 5 GHZ, and 6 GHz frequency bands. Channel division is performed based on the newly opened free 6 GHz frequency band, and a supportable bandwidth may exceed a maximum bandwidth 160 MHz supported in 5 GHz, for example, may be 320 MHz. In IEEE 802.11ax next-generation Wi-Fi Extremely High Throughput protocol, a peak throughput may also be increased by using more streams, for example, increasing a quantity of streams to 16, through cooperation with a plurality of frequency bands (2.4 GHZ, 5 GHZ, and 6 GHz), or in another manner, in addition to using an ultra-high bandwidth. On a same frequency band, a peak throughput may be further increased through cooperation of a plurality of channels or in another manner. This reduces a service transmission delay. In the following, a plurality of frequency bands or a plurality of channels are collectively referred to as a plurality of links. Although a plurality of links are configured for 802.11ax Wi-Fi and earlier Wi-Fi that have a same operating frequency band, a different basic service set (BSS) is usually established for each of the plurality of links, and communication with a station in a BSS to which the link belongs can be performed on only one link at the same time.

Main functions of 802.11ax and an earlier multiple basic service set identifier (BSSID) technology are to virtualize one physical AP into a plurality of logical APs, that is, forming a plurality of virtual networks. Each virtual network is used to manage a different station. Similar to AP products in a current Wi-Fi scenario, an AP can be virtualized into a home AP and a guest AP.

When the multiple BSS ID technology is applied to a multi-link device (MLD), how to implement probing and association between a non-access point station (non-AP STA) MLD and an access point station (AP STA) MLD is a technical problem that is being studied by technical personnel.

SUMMARY

Embodiments of this application disclose a requesting method for probing a multi-link device in a WLAN, a response method for probing a multi-link device, and a related apparatus.

A first aspect of this application provides a station in a wireless local area network WLAN, including: a processor, configured to generate the probe request frame, where the probe request frame is used to request a first AP to feed back a communication parameter of an AP MLD in which the first AP is located, the first AP is a nontransmitted basic service set identifier nontransmitted BSSID AP, and the communication parameter of the AP MLD is communication parameters of a plurality of links supported by the AP MLD; and a transceiver, configured to send the probe request frame to the first AP.

A second aspect of this application provides a requesting method for probing an access point multi-link device, where the method is executed by a station in a wireless local area network WLAN, and the method includes: generating the probe request frame, where the probe request frame is used to request a first AP to feed back a communication parameter of an AP MLD in which the first AP is located, the first AP is a nontransmitted basic service set identifier nontransmitted BSSID AP, and the communication parameter of the AP MLD is communication parameters of a plurality of links supported by the AP MLD; and sending the probe request frame to the first AP.

In the station provided in the first aspect or the method provided in the second aspect, the probe request frame carries first indication information, and the first indication information indicates to feed back the communication parameter of the AP MLD in which the first AP is located.

According to the station provided in the first aspect or the method provided in the second aspect, the first indication information is carried in any one of the following elements: a multi-link element multi-link element, a request MLD element request MLD element, and a known MLD element known MLD element.

The station provided in the first aspect or the method provided in the second aspect further includes: receiving a probe response frame from a second AP, where the probe response frame carries the communication parameter of the AP MLD in which the first AP is located.

In an implementation, the communication parameter of the AP MLD in which the first AP is located includes communication parameters corresponding to all or some links corresponding to the AP MLD.

In an implementation, the probe request frame further carries a field indicating a link identifier of the AP MLD, and the field indicating the link identifier of the AP MLD indicates the first AP to feed back a communication parameter of a corresponding link in the AP MLD in which the first AP is located.

In an implementation, the field indicating the link identifier of the AP MLD is a link configuration element or a link index bitmap.

According to the station provided in the first aspect or the method provided in the second aspect, the probe response frame carries the communication parameter of the first AP by using a multiple BSSID element multiple BSSID element, and carries a communication parameter of another AP in the AP MLD of the first AP in a multilink element of a nontransmitted BSSID profile corresponding to the first AP.

According to the station provided in the first aspect or the method provided in the second aspect, a non-inheritance element of the probe request frame further carries indication information indicates to request some information elements of the AP MLD.

In the station provided in the first aspect or the method provided in the second aspect, any one of the multi-link element, the request MLD element, and the known MLD element further carries the indication information indicates to request the some information elements of the AP MLD.

During implementation of the station in the first aspect or the method in the second aspect of this application, when a non-AP STA wants to request a communication parameter of an AP MLD, the non-AP STA may send a probe request frame to a logical AP of the AP MLD. Even if the logical AP is configured as a nontransmitted BSSID, another transmitted BSSID AP belonging to a same MSSID set may respond to the probe request frame, to reply with the communication parameter of the AP MLD. This can resolve a technical problem in the conventional technology that a communication parameter of an AP MLD on another link cannot be obtained by sending the probe request frame.

A third aspect of this application provides a station in a wireless local area network WLAN, including: a processor, configured to generate the probe request frame, where the probe request frame is used to request a second AP to feed back a communication parameter that is of an AP MLD and that is related to the second AP, the second AP is a transmitted basic service set identifier transmitted BSSID AP, and the communication parameter of the AP MLD is communication parameters of a plurality of links supported by the AP MLD; and a transceiver, configured to send the probe request frame to the second AP.

A second aspect of this application provides a requesting method for probing an access point multi-link device, where the method is executed by a station in a wireless local area network WLAN, and the method includes: generating the probe request frame, where the probe request frame is used to request a second AP to feed back a communication parameter that is of an AP MLD and that is related to the second AP, the second AP is a transmitted basic service set identifier transmitted BSSID AP, and the communication parameter of the AP MLD is communication parameters of a plurality of links supported by the AP MLD; and sending the probe request frame to the second AP.

In the station according to the third aspect of this application or the method according to the fourth aspect, the probe request frame carries second indication information, and the second indication information indicates the second AP to feed back the communication parameter that is of the AP MLD and that is related to the second AP.

In the station according to the third aspect or the method according to the fourth aspect of this application, the communication parameter that is of the AP MLD and that is related to the second AP includes at least one of the following:
  a communication parameter of the AP MLD in which the second AP is located;
  a communication parameter of an AP MLD in which another AP belonging to a same multiple transmitted basic service set identifier MBSSID set as the second AP is located; or
  a communication parameter of an AP MLD in which another AP collocated with the second AP is located.

According to the station of the third aspect or the method of the fourth aspect of this application, the second indication information is carried in the probe request frame, the second indication information indicates an MLD identifier or an MLD address, and the MLD identifier or the MLD address indicates the second AP to feed back a communication parameter of an AP MLD corresponding to the MLD identifier or the MLD address.

According to the station in the third aspect or the method in the fourth aspect of this application, the second indication information is carried in the probe request frame, and the second indication information indicates, in a bitmap manner, the AP MLD related to the second AP that is requested. The indicating, in the bitmap manner, the requested AP MLD may be performing indication by using a BSSID identifier bitmap field.

In the station according to the third aspect of this application or the method according to the fourth aspect, the second indication information carries any one of the following elements: a multi-link element multi-link element, a request MLD element request MLD element, and a known MLD element known MLD element.

During implementation of this embodiment of this application, when a non-AP STA wants to request a communication parameter of an AP MLD, the non-AP STA may send a probe request frame to an AP configured as a transmitted BSSID AP. The transmitted BSSID AP may reply a communication parameter of an MLD in which another AP belonging to a same MSSID set is located and/or a communication parameter of an MLD in which another AP collocated with the transmitted BSSID AP is located. Therefore, a technical problem in the conventional technology that the MLD communication parameter of the another AP cannot be obtained by sending the probe request frame is resolved.

A fifth aspect of this application provides a first access point AP in a wireless local area network WLAN, where the first AP is a nontransmitted basic service set identifier nontransmitted BSSID AP, and the first AP includes: a transceiver, configured to receive a probe request frame from a station, where the probe request frame is used to request the first AP to feed back a communication parameter of an AP MLD in which the first AP is located, and the communication parameter of the AP MLD is communication parameters of a plurality of links supported by the first AP.

The transceiver is further configured to request a second AP that belongs to a same MBSSID set as the first AP to assist the first AP to feed back a probe response frame to the station, where the probe response frame carries the communication parameter of the AP MLD.

A sixth aspect of this application provides a response method for probing an access point multi-link device, where the method is applied to a first access point AP in a wireless local area network WLAN, the first AP is a nontransmitted basic service set identifier nontransmitted BSSID AP, and the method includes: receiving a probe request frame from a station, where the probe request frame is used to request the first AP to feed back a communication parameter of an AP MLD in which the first AP is located, and the communication parameter of the AP MLD is communication parameters of a plurality of links supported by the first AP; and requesting a second AP that belongs to a same MBSSID set as the first AP to assist the first AP to feed back a probe response frame to the station, where the probe response frame carries the communication parameter of the AP MLD.

A seventh aspect of this application provides a second access point AP in a wireless local area network WLAN, where the second AP is a transmitted basic service set identifier transmitted BSSID AP, and the second AP includes: a transceiver, configured to receive a probe request frame from a first AP, where the probe request frame is used to request the second AP to assist the first AP to feed back a communication parameter of an AP MLD in which the second AP is located, the first AP is a nontransmitted basic service set identifier nontransmitted BSSID AP, and belongs to a same MBSSID set as the second AP, and a communication parameter of the AP MLD is communication parameters of a plurality of links supported by the AP MLD; and a processor, configured to generate a probe response frame, where the probe response frame carries the communication parameter of the AP MLD.

An eighth aspect of this application provides a response method for probing an access point multi-link device, where the method is applied to a second access point AP in a wireless local area network WLAN, the second AP is a transmitted basic service set identifier transmitted BSSID AP, and the method includes: receiving a probe request frame from a first AP, where the probe request frame is used to request the second AP to assist the first AP to feed back a communication parameter of an AP MLD in which the second AP is located, the first AP is a nontransmitted basic service set identifier nontransmitted BSSID AP, and belongs to a same MBSSID set as the second AP, and a communication parameter of the AP MLD is communication parameters of a plurality of links supported by the AP MLD; and generating a probe response frame, where the probe response frame carries the communication parameter of the AP MLD.

According to the access point provided in the seventh aspect of this application or the method provided in the eighth aspect, the probe response frame carries some information elements in the communication parameter that is of the AP MLD and that is related to the second AP.

During implementation of the access point provided in the seventh aspect or the method provided in the eighth aspect, a nontransmitted BSSID AP may feed back, by using another AP collocated with the nontransmitted BSSID AP or another AP belonging to a same MBSSID set as the non-AP AP, a communication parameter of an AP MLD in which the nontransmitted BSSID AP is located to a non-AP STA.

A ninth aspect of this application provides a second access point AP in a wireless local area network WLAN, where the second AP is a transmitted basic service set identifier transmitted BSSID AP, and the second AP includes: a transceiver, configured to receive a probe request frame from a station, where the probe request frame is used to request a second AP to feed back a communication parameter that is of an AP MLD and related to the second AP, and the communication parameter of the AP MLD is communication parameters of a plurality of links supported by the AP MLD; a processor, configured to generate a probe response frame, where the probe response frame carries the communication parameter that is of the AP MLD and that is related to the second AP; and a transceiver, configured to send the probe response frame to the station.

A tenth aspect of this application provides a response method for probing an access point multi-link device, where the method is applied to a second access point AP in a wireless local area network WLAN, the second AP is a transmitted basic service set identifier transmitted BSSID AP, and the method includes: receiving a probe request frame from a station, where the probe request frame is used to request a second AP to feed back a communication parameter that is of an AP MLD and related to the second AP, and the communication parameter of the AP MLD is communication parameters of a plurality of links supported by the AP MLD; generating a probe response frame, where the probe response frame carries the communication parameter that is of the AP MLD and that is related to the second AP; and sending the probe response frame to the station.

According to the access point provided in the ninth aspect of this application or the method provided in the tenth aspect, the communication parameter that is of the AP MLD and that is related to the second AP includes at least one of the following:

a communication parameter of the AP MLD in which the second AP is located;

a communication parameter of an AP MLD in which another AP belonging to a same multiple transmitted basic service set identifier MBSSID set as the second AP is located; or a communication parameter of an AP MLD in which another AP collocated with the second AP is located.

According to the access point provided in the ninth aspect of this application or the method provided in the tenth aspect. When the probe request frame carries second indication information, and the second indication information indicates an MLD identifier or an MLD address, the probe response frame carries a communication parameter of the AP MLD corresponding to the MLD identifier or the MLD address of the probe request frame.

According to the access point provided in the ninth aspect of this application or the method provided in the tenth aspect, the probe request frame carries the second indication information. When the second indication information indicates, in a bitmap manner, the AP MLD requested by the probe request frame, a communication parameter of the AP MLD that is indicated in a bitmap manner is carried in the probe response frame. The requested AP MLD indicated in the bitmap manner may be a BSSID identifier bitmap field. Each bit in the BSSID identifier bitmap represents a corresponding AP MLD.

According to the access point provided in the ninth aspect of this application or the method provided in the tenth aspect, the probe response frame carries a communication parameter of an AP MLD in which a first AP related to the second AP is located, and the first AP is a first AP belonging to the same MSSID set as the second AP, and/or a first AP collocated with the second AP.

According to the access point provided in the ninth aspect of this application or the method provided in the tenth aspect, the probe response frame carries the communication parameter of the first AP by using a multiple BSSID element multiple BSSID element, and carries a communication parameter of another AP in the AP MLD of the first AP in a multi-link element of a nontransmitted BSSID profile nontransmitted BSSID profile corresponding to the first AP.

According to the access point provided in the ninth aspect of this application or the method provided in the tenth aspect, the probe response frame carries some information elements in the communication parameter that is of the AP MLD and that is related to the second AP.

The station in the first aspect, the station in the third aspect, the first access point provided in the fifth aspect, the second access point provided in the seventh aspect, and the second access point provided in the ninth aspect may be a chip. The processing unit may be a processing circuit of the chip. The transceiver unit may be an input/output interface circuit. The processing circuit may be configured to process signaling or data information provided by the input/output interface circuit. The input/output interface circuit may be configured to input/output data or signaling information for the chip.

According to an eleventh aspect of embodiments of this application, a computer-readable storage medium is provided. The computer-readable storage medium stores computer program code. When the computer program is run on a processor, the processor is enabled to perform the method in any one of the second aspect, the fourth aspect, the sixth aspect, the eighth aspect, the tenth aspect, and the corresponding possible implementations.

According to a twelfth aspect of embodiments of this application, a computer program product is provided. The program product stores a computer program (instructions) executed by the foregoing processor. When the computer program is run on the processor, the processor is enabled to perform the method in any one of the second aspect, the fourth aspect, the sixth aspect, the eighth aspect, the tenth aspect, and the corresponding possible implementations.

According to a thirteenth aspect of embodiments of this application, a communication apparatus is provided. The apparatus includes a processor, and may further include a transceiver and a memory. The transceiver is configured to receive and send information, or is configured to communicate with another network element. The memory is configured to store a computer program (instructions). The processor is configured to execute the computer program, to support the communication apparatus to perform the method in any one of the second aspect, the fourth aspect, the sixth aspect, the eighth aspect, the tenth aspect, and the corresponding possible implementations.

According to a fourteenth aspect of embodiments of this application, a communication apparatus is provided. The apparatus may exist in a product form of a chip. A structure of the apparatus includes a processor, and may further include a memory. The memory is configured to be coupled to the processor, and store a program (instructions) and data that are necessary for the apparatus. The processor is configured to execute the computer program stored in the memory, to support the communication apparatus to perform the method in any one of the second aspect, the fourth aspect, the sixth aspect, the eighth aspect, the tenth aspect, and the corresponding possible implementations. Optionally, the memory may be located in the processor, and is an internal storage. Alternatively, the processor may be located outside the processor, is coupled to the processor, and is an external storage.

BRIEF DESCRIPTION OF THE DRAWINGS

The following describes accompanying drawings used in embodiments of this application.

DETAILED DESCRIPTION OF ILLUSTRATIVE EMBODIMENTS

Figure 1:
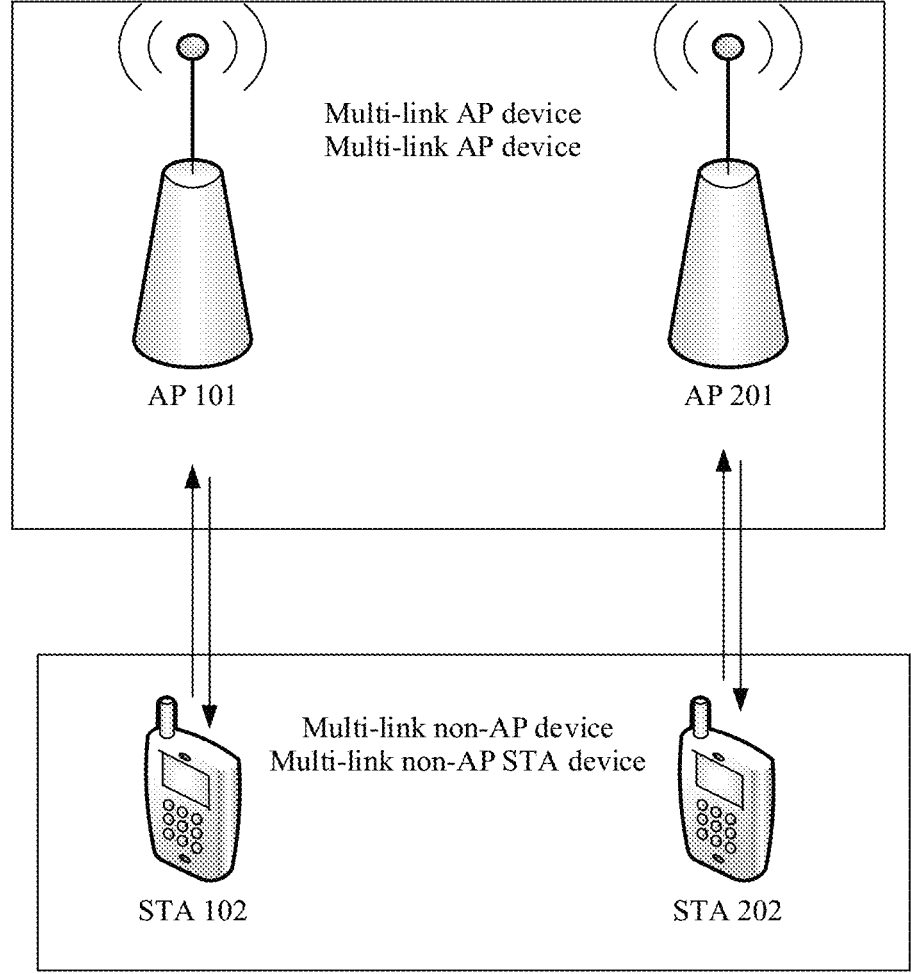
FIG. 1 is a schematic diagram of a structure of a communication system according to an embodiment of this application.

The following first describes related technologies in this application, and then describes embodiments of this application with reference to the accompanying drawings.

An embodiment of this application provides a communication method applied to a wireless communication system. The wireless communication system may be a wireless local area network (WLAN) or a cellular network. The method may be performed by a communication device in the wireless communication system or a chip or a processor in the communication device. The communication device may be a wireless communication device that supports concurrent transmission performed on a plurality of links. For example, the communication device is referred to as a multi-link device or a multi-band device. For example, in the wireless local area network, the communication device supports communication performed by using IEEE 802.11 series protocols, and the IEEE 802.11 series protocols includes: 802.11be, 802.11ax, or 802.11a/b/g/n/ac.

1. A Multi-Link Device MLD is Also Referred to as a Multi-Band Device.

The multi-link device MLD includes one or more affiliated stations, and the affiliated station is a logical station. "A multi-link device includes an affiliated station" is also briefly described as "A multi-link device includes a station" in embodiments of this application. An affiliated station may be an access point (AP) or a non-access point station (non-AP STA). For ease of description, in this application, a multi-link device whose affiliated station is an AP may be referred to as a multi-link AP, a multi-link AP device, or an AP multi-link device, and a multi-link device whose affiliated station is a non-AP STA may be referred to as a multi-link STA, a multi-link STA device, or a STA multi-link device.

The multi-link device MLD may implement wireless communication in compliance with 802.11 series protocols, for example, in compliance with the Extremely High Throughput (EHT) protocol, or in compliance with 802.11 be-based or 802.11 be-compatible protocol, thereby implementing communication with another device. The another device may be a multi-link device or may not be a multi-link device.

Each logical station may operate on one link, and a plurality of logical stations are allowed to operate on a same link. A link identifier mentioned below identifies or represents one station operating on one link. In other words, if there is more than one logical station on one link, more than one link identifier is required to identify or represent the logical stations. The link mentioned below sometimes also indicates a station operating on the link. If data transmission is performed between a multi-link device and another multi-link device, before communication, the multi-link device and the another multi-link device may first negotiate or communicate with each other about a correspondence between a link identifier and a link or a station on a link, or an AP multi-link device indicates a correspondence between a link identifier and a link or a station on a link through a broadcast management frame, for example, a beacon frame. Therefore, during data transmission, a link identifier is carried without transmitting a large amount of signaling information to indicate a link or a station on a link. This reduces signaling overheads and improves transmission efficiency.

The following uses an example on which the foregoing one multi-link device is an AP multi-link device, and the foregoing another multi-link device is a STA multi-link device for description.

For example, when the AP multi-link device establishes a BSS, a management frame, for example, a beacon frame, sent by the AP multi-link device carries an element including a plurality of link identifier information fields. Each link identifier information field may indicate a correspondence between a link identifier and a station operating on a link. Each link identifier information field includes a link identifier, and further includes one or more of a MAC address, an operating class, and a channel number. One or more of the MAC address, the operating class, and the channel number may identify a link. For another example, in a multi-link association establishment process, the AP multi-link device and the STA multi-link device negotiate for a plurality of link identifier information fields. In subsequent communication, the AP multi-link device or the STA multi-link device identifies or represents a station in the multi-link device by using a link identifier. The link identifier may further represent one or more attributes of a MAC address, an operating set, and a channel number of the station. The MAC address may alternatively be an association identifier of the associated AP multi-link device. Optionally, if a plurality of stations operate on one link, meanings identified by a link identifier (link ID) include not only an operation set in which the link is located and a channel number, but also an identifier of a station operating on the link, for example, a MAC address or an association identifier (AID) of a station.

FIG. 1 is a diagram of an application scenario of an embodiment of this application by using a wireless local area network as an example. The application scenario includes: a first station 101, a second station 102, a third station 201, and a fourth station 202. The first station 101 may communicate with the second station 102 by using a plurality of links, and the third station 201 may communicate with the fourth station 202 by using a plurality of links, thereby improving a throughput. As shown in FIG. 1, for example, the first station 101 is a multi-link AP device, the second station 102 is a multi-link STA device, the third station 201 is a multi-link AP device, and the fourth station 202 is a multi-link STA device. Certainly, the second station 102 and/or the fourth station 202 may alternatively be single-link STA devices. In addition, in a scenario, the first station 101 is an AP multi-link device, and the second station 102 is a STA multi-link device or a station (for example, a single-link station). In another scenario, the first station 101 is a STA multi-link device, and the second station 102 is an AP (for example, a single-link AP) or an AP multi-link device. In still another scenario, the first station 101 is an AP multi-link device, and the second station 102 is an AP multi-link device or an AP. In still another scenario, the first station 101 is a STA multi-link device, and the second station 102 is a STA multi-link device or a STA. Certainly, the wireless local area network may further include another device. A quantity and a type of devices shown in FIG. 1 are merely examples.

Figure 2A:
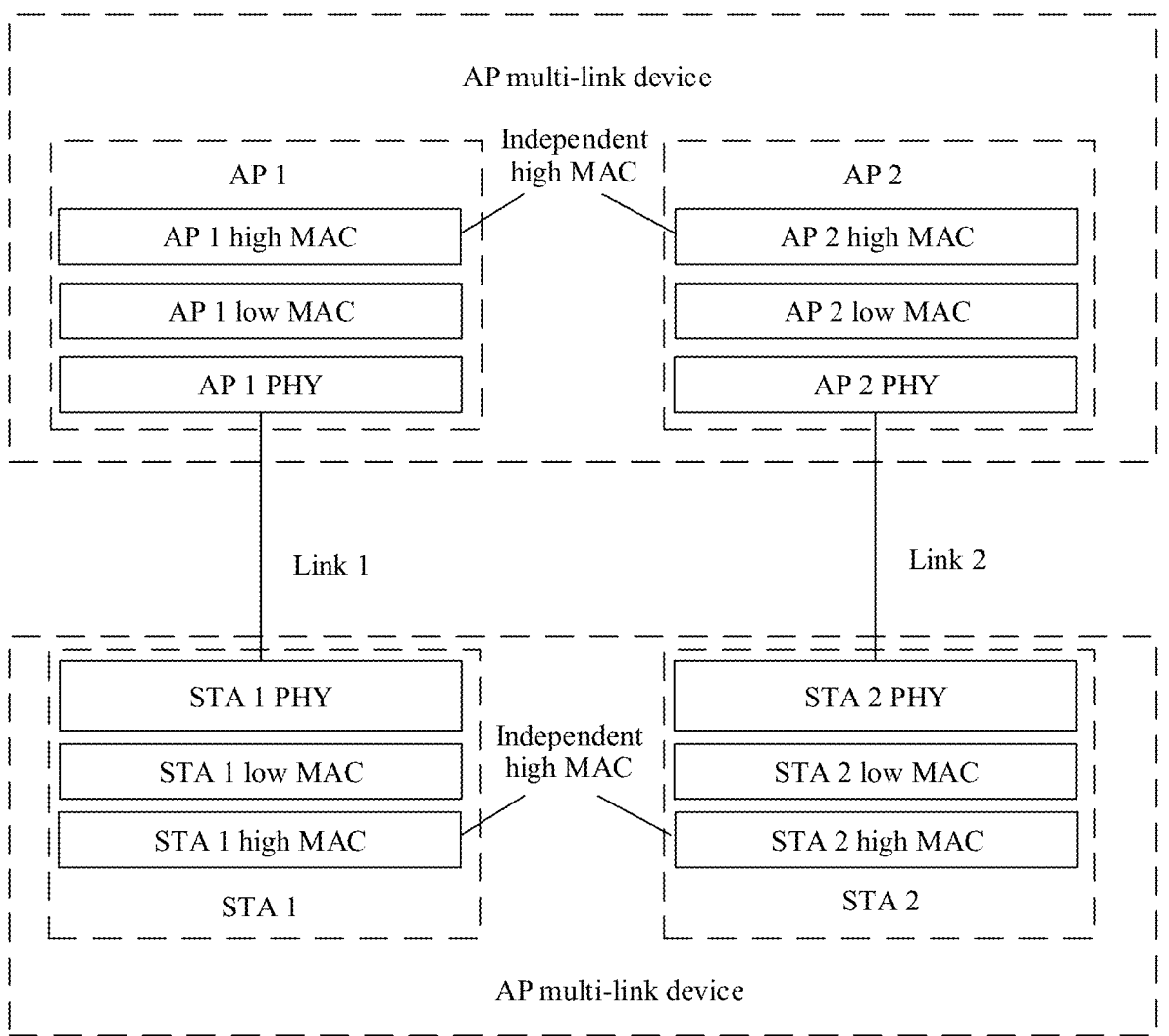
FIG. 2a is a schematic diagram of a structure of a multi-link device according to an embodiment of this application.
Figure 2B:
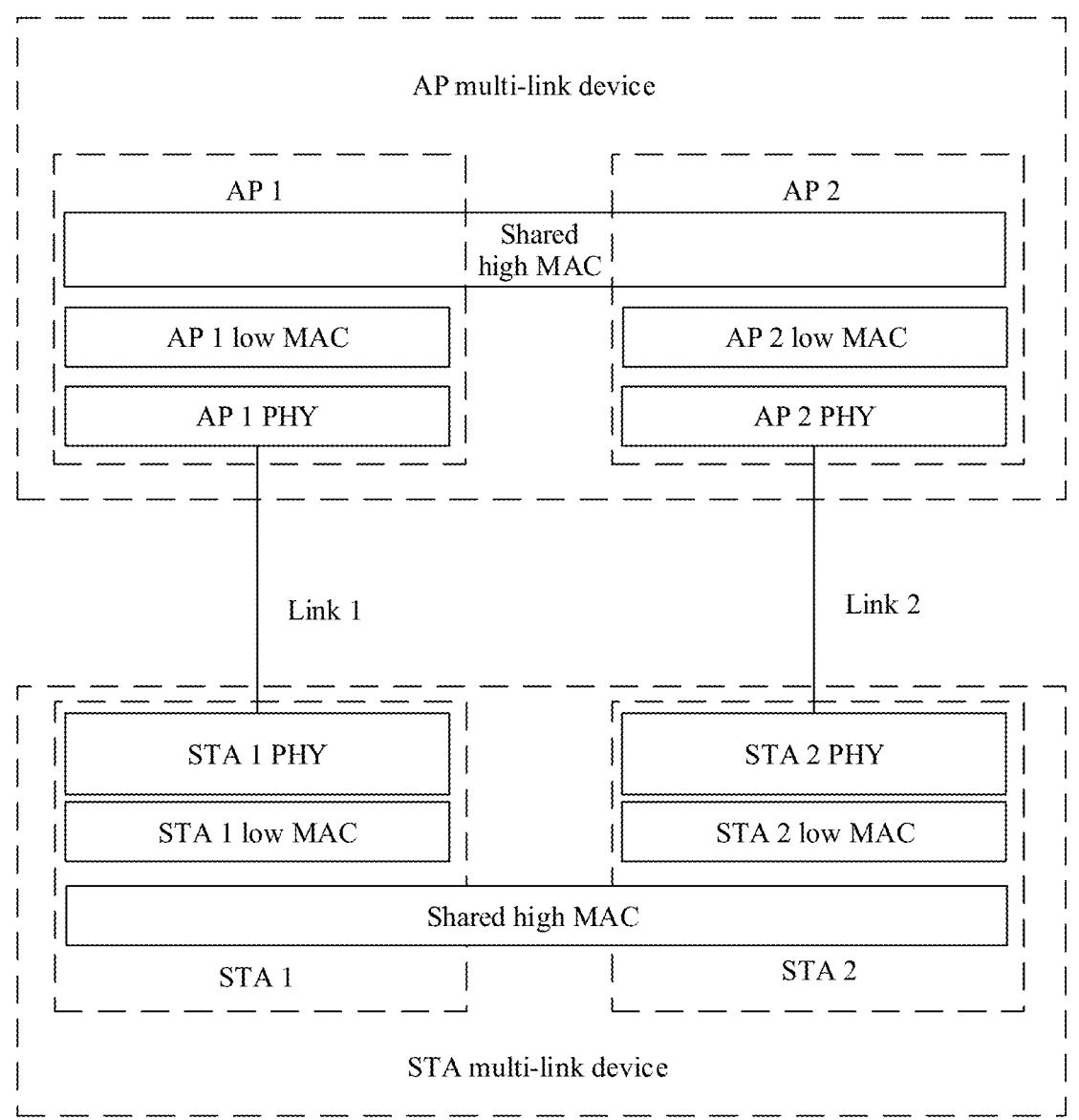
FIG. 2b is a schematic diagram of a structure of another multi-link device according to an embodiment of this application.

FIG. 2a and FIG. 2b are schematic diagrams of structures of an AP multi-link device and a STA multi-link device that participate in communication. 802.11 standards focus on 802.11 physical layer (PHY) and media access control (MAC) layer parts of an AP multi-link device and a STA multi-link device (such as a mobile phone and a notebook computer).

As shown in FIG. 2a, a plurality of APs included in the AP multi-link device are independent of each other at a low MAC layer and a PHY layer, and are also independent of each other at a high MAC layer. A plurality of STAs included in the STA multi-link device are independent of each other at a low MAC layer and a PHY layer, and are also independent of each other at a high MAC layer.

As shown in FIG. 2b, a plurality of APs included in the AP multi-link device are independent of each other at a low MAC layer and a PHY layer, and share a high MAC layer. A plurality of STAs included in the STA multi-link device are independent of each other at a low MAC layer and a PHY layer, and share a high MAC layer.

Certainly, the STA multi-link device may use a structure on which high MAC layers are independent of each other, and the AP multi-link device may use a structure on which a high MAC layer is shared. Alternatively, the STA multi-link device may use a structure in which a high MAC layer is shared, and the AP multi-link device may use a structure in which high MAC layers are independent of each other. For example, the high MAC layer or the low MAC layer may be implemented by one processor in a chip system of the multi-link device, or may be implemented by different processing modules in a chip system.

Figure 2C:
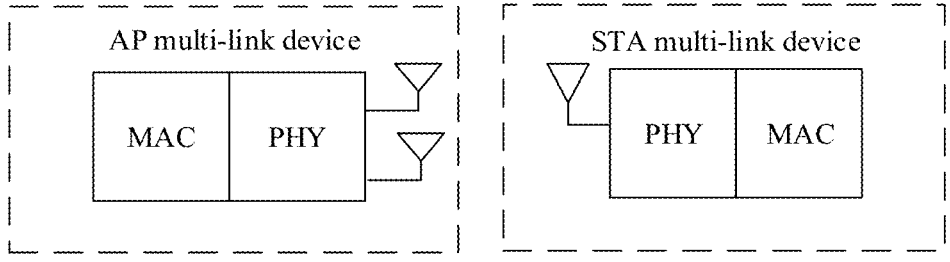
FIG. 2c is a schematic diagram of a structure of still another multi-link device according to an embodiment of this application.

For example, the multi-link device in this embodiment of this application may be a single-antenna device, or may be a multi-antenna device. For example, the multi-link device may be a device with more than two antennas. The quantity of antennas included in the multi-link device is not limited in the embodiments of this application. For example, in FIG. 2c, the AP multi-link device is a multi-antenna device and the STA multi-link device is a single-antenna device. In this embodiment of this application, the multi-link device may allow services of a same access type to be transmitted on different links, or even allow same data packets to be transmitted on different links. Alternatively, the multi-link device may not allow services of a same access type to be transmitted on different links, but may allow services of different access types to be transmitted on different links.

Figure 3A:
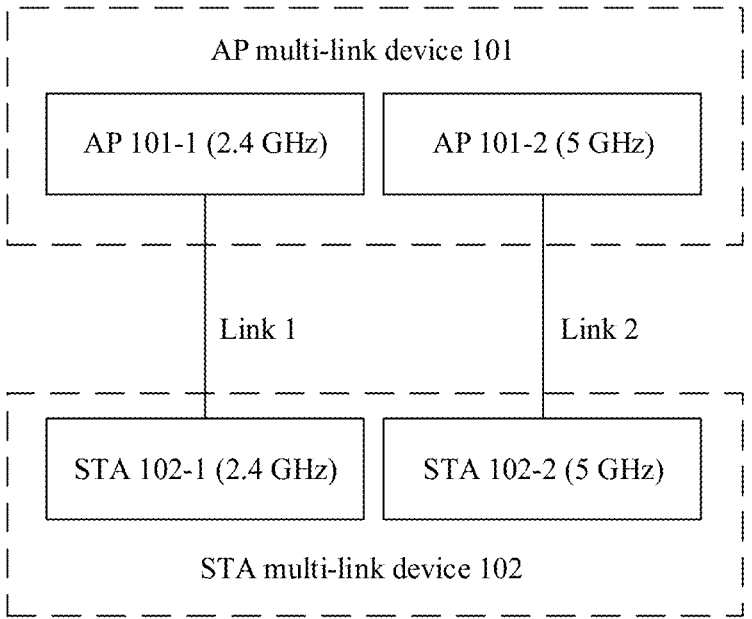
FIG. 3a is a schematic diagram of multi-link communication according to an embodiment of this application.
Figure 3B:
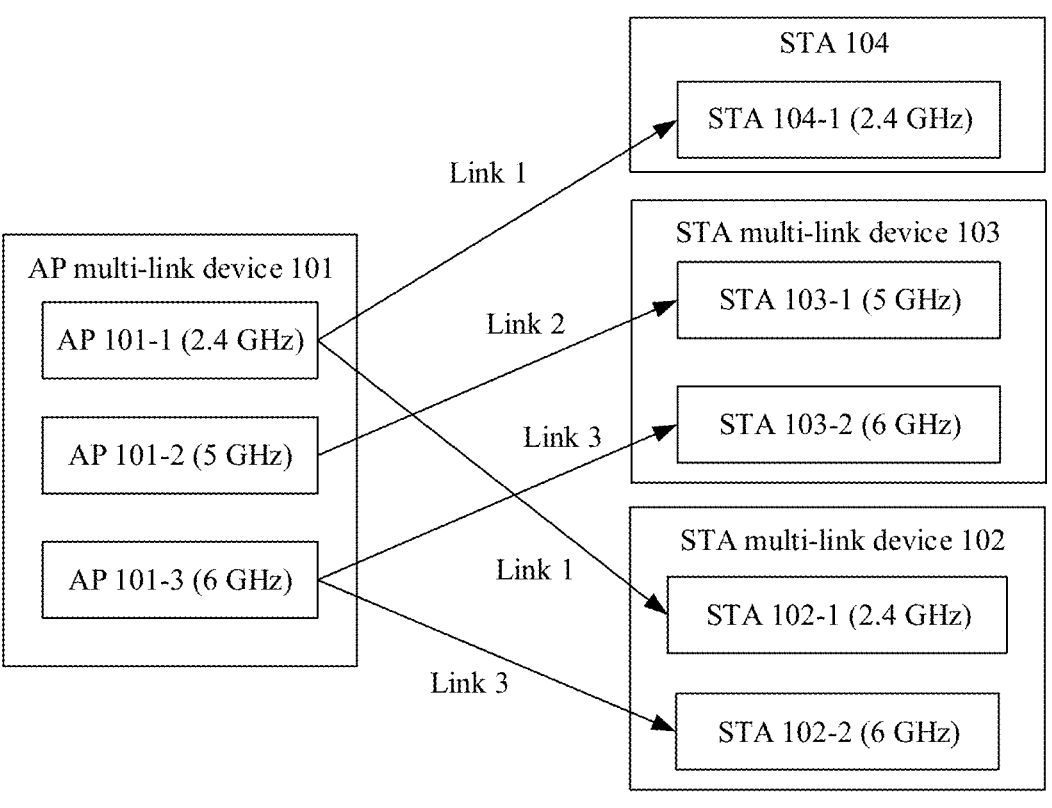
FIG. 3b is another schematic diagram of multi-link communication according to an embodiment of this application.

Frequency bands on which the multi-link device operates may include but are not limited to sub 1 GHZ, 2.4 GHz, 5 GHZ, 6 GHZ, and a high frequency 60 GHz. FIG. 3a and FIG. 3b are two schematic diagrams of communication between a multi-link device and another device in a wireless local area network through a plurality of links.

FIG. 3a shows a scenario in which an AP multi-link device 101 communicates with a STA multi-link device 102. The AP multi-link device 101 includes an affiliated AP 101-1 and an affiliated AP 101-2, the STA multi-link device 102 includes an affiliated STA 102-1 and an affiliated STA 102-2, and the AP multi-link device 101 communicate with the STA multi-link device 102 in parallel on a link 1 and a link 2.

FIG. 3b shows a scenario in which an AP multi-link device 101 communicates with a STA multi-link device 102, a STA multi-link device 103, and a STA 104. The AP multi-link device 101 includes an affiliated AP 101-1 to an affiliated AP 101-3. The STA multi-link device 102 includes two affiliated STAs: a STA 102-1 and a STA 102-2. The STA multi-link device 103 includes two affiliated STAs: a STA 103-1 and a STA 103-2. A STA 103-3 and the STA 104 each are a single-link device. The AP multi-link device may separately communicate with the STA multi-link device 102 on a link 1 and a link 3, communicate with the STA multi-link device 103 on a link 2 and a link 3, and communicate with the STA 104 on a link 1. For example, the STA 104 operates on a 2.4 GHz frequency band. The STA multi-link device 103 includes the STA 103-1 and the STA 103-2, where the STA 103-1 operates on a 5 GHz frequency band, and the STA 103-2 operates on a 6 GHz frequency band. The STA multi-link device 102 includes the STA 102-1 and the STA 102-2, where the STA 102-1 operates on a 2.4 GHz frequency band, and the STA 102-2 operates on a 6 GHz frequency band. The AP 101-1 operating on the 2.4 GHz frequency band in the AP multi-link device may perform uplink or downlink data transmission with the STA 104 and the STA 102-2 in the STA multi-link device 102 on a link 1. The AP 101-2 operating on the 5 GHz frequency band in the AP multi-link device may perform uplink or downlink data transmission with the STA 103-1 operating on the 5 GHz frequency band in the STA multi-link device 103 on a link 2. The AP 101-3 operating on the 6 GHz frequency band in the AP multi-link device 101 may perform uplink or downlink data transmission with the STA 102-2 operating on the 6 GHz frequency band in the STA multi-link device 102 on a link 3, and may also perform uplink or downlink data transmission with the STA 103-2 in the STA multi-link device on the link 3.

It should be noted that FIG. 3a shows that the AP multi-link 101 device supports only two frequency bands, and FIG. 3b only uses an example in which the AP multi-link device 101 supports three frequency bands (2.4 GHz, 5 GHZ, and 6 GHz), each frequency band corresponds to one link, and the AP multi-link device 101 may operate on one or more of link 1, link 2, and link 3 for illustration. On an AP side or a STA side, the link herein may be further understood as a station operating on the link. In an actual application, the AP multi-link device and the STA multi-link device may further support more or fewer frequency bands, and values of the frequency bands are not limited to 2.4 GHZ, 5 GHz, 6 GHZ, and the like. In other words, the AP multi-link device and the STA multi-link device may operate on more or fewer links. This is not limited in this embodiment of this application For example, the multi-link device is an apparatus with a wireless communication function, and the apparatus may be a device, or may be a chip, a processing system, or the like installed on the device. The device on which the chip or the processing system is installed may implement methods and functions in embodiments of this application under control of the chip or the processing system. For example, the multi-link STA in embodiments of this application has a wireless transceiver function, may support the 802.11 series protocols, and may communicate with the multi-link AP, another multi-link STA, or a single-link device. For example, the multi-link STA is any user communication device that allows a user to communicate with an AP and then with the WLAN. For example, the multi-link STA may be user equipment that can access a network, for example, a tablet computer, a desktop computer, a laptop computer, a notebook computer, an ultra-mobile personal computer (UMPC), a handheld computer, a netbook, a personal digital assistant (PDA), or a mobile phone; or may be an internet of things node in the internet of things, an in-vehicle communication apparatus in the internet of vehicles, or the like. The multi-link STA may alternatively be a chip or a processing system in the foregoing terminals. The multi-link AP in embodiments of this application is an apparatus that provides a service to the multi-link STA, and can support the 802.11 series protocols. For example, the multi-link AP may be a communication entity such as a communication server, a router, a switch, or a network bridge, or the multi-link AP may include various forms of macro base stations, micro base stations, relay stations, or the like. Certainly, the multi-link AP may further be a chip and a processing system in the various forms of devices, to implement the methods and functions of embodiments of this application. In addition, the multi-link device may support high-rate and low-latency transmission. With continuous evolution of wireless local area network application scenarios, the multi-link device may be further applied to more scenarios, for example, serving as a sensor node (for example, a smart water meter, a smart electricity meter, or a smart air detection node) in smart city, a smart device (for example, a smart camera, a projector, a display screen, a television, a stereo, a refrigerator, or a washing machine) in smart home, a node in internet of things, an entertainment terminal (for example, AR, VR, or another wearable device), a smart device (for example, a printer, or a projector) in smart office, an internet of vehicles device in internet of vehicles, or infrastructure (for example, a vending machine, a self-service navigation console, a self-checkout device, or a self-service food machine) in daily life scenarios. Specific forms of the multi-link STA and the multi-link AP are not specifically limited in embodiments of this application, and are merely examples for description herein. The 802.11 series protocols may include 802.11be, 802.11ax, 802.11a/b/g/n/ac, and the like.

2. A Multiple Basic Service Set Identifier (BSSID) Mode

A multiple BSSID set is a combination of some collaborative or cooperative APs, and all the cooperative APs share one operating class, one channel number, and one antenna port. In the multiple BSSID set, there is only one transmitted BSSID AP, and other APs are nontransmitted BSSID APs. Information about the multiple BSSID set (that is, a multiple BSSID element) is carried in a beacon frame, a probe response frame, or a neighbor report sent by the transmitted BSSID AP. Information about a BSSID of the nontransmitted BSSID AP is derived based on a multiple BSSID element or the like in the foregoing received beacon frame, probe response frame, neighbor report.

In a multiple BSSID technology, one physical AP may be virtualized into a plurality of logical APs to form a multiple BSSID set. Each virtualized AP manages one BSS, and different logical APs generally have different SSIDs and permission, such as a security mechanism or a transmission occasion. In the multiple BSSID set, a BSSID of an AP is configured as a transmitted BSSID, which is referred to as a transmitted AP, and BSSIDs of other APs are configured as nontransmitted BSSIDs, which are referred to as nontransmitted APs. Generally, a plurality of APs in the multiple BSSID may also be understood as a plurality of cooperative AP devices obtained by virtualizing one AP device. Only an AP whose BSSID is a transmitted BSSID can send a management frame, for example, a beacon frame (beacon) and a probe response frame (probe response). The beacon frame sent by the AP whose BSSID is the transmitted BSSID includes a multiple BSSID element, and the APs whose BSSID is the nontransmitted BSSID cannot send a beacon frame. Association identifiers (AID) allocated by a plurality of virtual APs to stations managed by the plurality of virtual APs share one space, that is, the AIDs allocated to stations managed by the plurality of virtual BSSs cannot be the same.

For ease of description, an AP in a BSS identified by a transmitted BSSID in a multiple BSS set is referred to as a transmitted BSSID AP, and an AP in a BSS identified by a nontransmitted BSSID is referred to as a nontransmitted BSSID AP in the following descriptions.

In an example, as shown in Table 1, the multiple BSSID element includes an element ID, a length, a maximum BSSID indicator, and a subelement. The maximum BSSID indicator indicates that a maximum quantity of BSSIDs included in the foregoing multiple BSSID set is n, and an optional subelement includes information about each nontransmitted BSSID. A receive end may calculate a value of each BSSID in the multiple BSSID set based on a reference BSSID, the maximum BSSID indicator, and a BSSID identifier. Each BSSID includes 48 bits. A value of most significant (48-n) bits of each BSSID in the multiple BSSID set is the same as a value of most significant (48-n) bits of the reference BSSID, and a value of least significant n bits of each BSSID in the multiple BSSID set is obtained by performing a modulo operation on a sum of a value of least significant n bits of the reference BSSID and a value of a BSSID identifier x by using $2n$. The reference BSSID (that is, the transmitted BSSID) is carried in a BSSID field in a MAC header of a frame (for example, a beacon frame) including the multiple BSSID element. For a specific calculation method, refer to the 802.11-2016 standard.

TABLE 1

| Multiple BSSID element | | | | |
|---|---|---|---|---|
| | Element ID | Length | Maximum BSSID indicator | Optional subelement |
| Byte | 1 | 1 | 6 | Variable |

Table 2 may show the "optional subelement" in Table 1.

TABLE 2

| Optional subelement | | |
|---|---|---|
| Subelement ID | Name | Extensible |
| 0 | Nontransmitted BSSID profile | No |
| 1-220 | Reserved | |
| 221 | Vendor-specific | Vendor-defined |
| 222-255 | Reserved | |

In Table 2, the nontransmitted BSSID profile includes an element or elements of one or more APs or DMG STAs having a nontransmitted BSSID, and the nontransmitted BSSID profile includes but is not limited to the following elements:

1. A plurality of other elements in a beacon and a nontransmitted BSSID capability related element that need to be included in each nontransmitted BSSID.
2. An SSID element and a multiple BSSID-index element:
3. An FMS descriptor element that is further included if the multiple BSSID element is carried in the beacon.
4. None of the following elements: timestamp and beacon frame interval fields, a DSSS parameter set, an IBSS parameter set, a country, a channel switch announcement, an extended channel switch announcement, a wide bandwidth channel switch, a transmit power envelope, supported operating classes, an IBSS DFS, ERP information, HT Capabilities, an HT operation, VHT capabilities, a VHT operation), SIG beacon compatibility (S1G Beacon Compatibility), a short beacon interval, SIG capabilities (S1G Capabilities), a SIG operation (S1G Operation (11ah)), and other elements. These elements usually have same element values as the AP corresponding to the transmitted BSSID.
5. An optional non-inheritance element: The element is the last element in the nontransmitted BSSID profile. The non-inheritance element includes IDs and element ID extensions of a series of elements that are in the nontransmitted BSSID and that cannot be inherited from the transmitted BSSID. It should be noted that specific content of the element is omitted herein. Specifically, as shown in Table 3, the non-inheritance element includes an element ID, a length, an element ID extension, an element ID list, and an element ID extension list. The element ID extension number are present only when an element ID value is 255.

TABLE 3

| Non-inheritance element | | | | |
|---|---|---|---|---|
| One byte | One byte | One byte | One or more bytes | One or more bytes |
| Element ID | Length | Element ID extension | Element ID list | Element ID extension list |

US 12,701,069 B2

15

3. Probe Request and Response

In a single-link scenario, a non-AP STA can initiate active scanning to discover an AP, so that the STA can select an appropriate AP to associate with.

Specifically, the non-AP STA may send a probe request frame. After receiving the probe request frame, an AP may reply with a probe response frame. The probe response frame carries related information of the AP, so that the non-AP STA can probe the AP and obtain various communication parameters of the AP.

The probe request frame may be broadcast, that is, all APs reply with a probe response frame after receiving the probe request frame. Alternatively, the probe request frame may be unicast, that is, the probe request frame is sent to a specific AP, and only the specific AP replies with a probe response frame after receiving the probe request frame.

In a scenario in which a non-AP STA supports a single link or a non-AP STA MLD and an AP MLD support a single link, to establish a multi-link transmission channel with the AP MLD, a logical non-AP STA (hereinafter referred to as a non-AP STA) of the non-AP STA or the non-AP STA MLD establishes a multi-link transmission channel with the AP MLD. This can also be implemented through active scanning.

For a device that supports both multi-link and MBSSID, there may an MBSSID set on each link. APs belonging to a same MBSSID set are classified into APs with nontransmitted BSSIDs and APs with transmitted BSSIDs. APs of transmitted BSSIDs in different MBSSID sets are not necessarily located in a same AP MLD.

Figure 4:
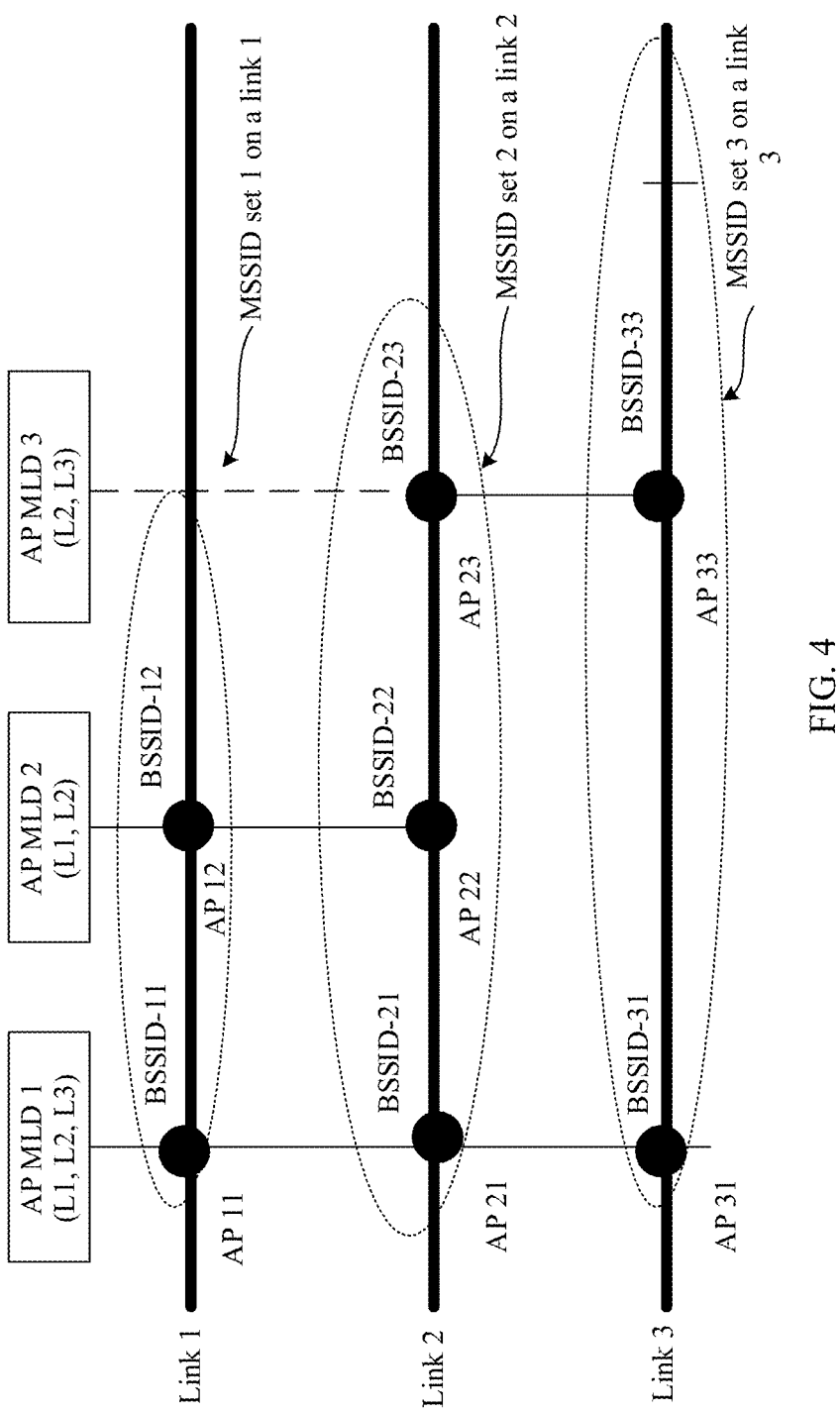
FIG. 4 is a schematic diagram of forming an MBSSID set by a plurality of multi-link devices in a WLAN according to an embodiment of this application.

For example, as shown in FIG. 4:

An AP MLD 1 includes three logical APs, denoted as an AP11, an AP21, and an AP31, where the AP11, the AP21, and the AP31 respectively operate on a link 1 (link1), a link 2 (link2), and a link 3 (link3). An AP MLD 2 includes two logical APs, denoted as an AP 12 and an AP 22, where the AP 12 and the AP 22 respectively operate on the link 1 and the link 2. An AP MLD 3 includes two logical APs, denoted as an AP 23 and an AP 33, where the AP 23 and the AP 33 respectively operate on the link 2 and the link 3.

The AP MLD 1 is used as an example. MAC addresses of the AP 21 and the AP 31 are BSSID_11, BSSID_21, and BSSID_31 respectively (Before 802.11ax, a BSSID of a BSS established by an AP is a MAC address of the AP, and may change subsequently. For ease of description herein, the MAC address of the AP is used as the BSSID of the BSS established by the AP).

The AP 11 is a member in a multiple BSSID set 1, and the multiple BSSID set 1 further includes the AP 12 whose MAC address is BSSID_12 in the AP MLD 2.

The AP 21 is a member in a multiple BSSID set 2, and the multiple BSSID set 2 further includes the AP 22 whose MAC address is BSSID_22 in the AP MLD 2 and the AP 23 whose MAC address is BSSID_23 in the AP MLD 3.

The AP 31 is a member in a multiple BSSID set 3, and the multiple BSSID set 3 further includes the AP 33 whose MAC address is BSSID_33 in the AP MLD 3.

In a configuration manner, the AP 11 in the MSSID set 1 is configured as a transmitted BSSID, and the AP 12 is configured as a nontransmitted BSSID. The AP 21 in the MSSID set 2 is configured as a transmitted BSSID, and the AP 22 and the AP 23 are configured as nontransmitted BSSIDs. The AP 33 in the MSSID set 3 is configured as a transmitted BSSID, and the AP 31 is configured as a nontransmitted BSSID. It can be learned that the AP 33, the AP 11, and the AP 21 configured as transmitted BSSIDs do not belong to a same AP MLD.

This embodiment of this application further relates to a collocated AP MLD or a collocated AP, which means that virtual APs belonging to a same physical AP form a collocated AP, or virtual AP MLDs form a collocated AP MLD.

For example, although the AP11 and the AP23 do not belong to a same MBSSID set, the AP11 and the AP23 physically belong to a same physical AP. The AP11 and the AP23 are considered as collocated, and the AP MLD 1 in which the AP11 is located and the AP MLD 3 in which the AP23 is located are collocated. As shown in the figure, all APs, or the AP MLD 1, the AP MLD 2, and the AP MLD 3 can be collocated.

In this embodiment of this application, a probing and responding mechanism between a non-AP STA and one or more AP MLDs is proposed. Logical APs in the plurality of AP MLDs may belong to a same MSSID, or may belong to different MSSIDs.

In a first case, if the non-AP STA wants to obtain a communication parameter of an AP MLD in which an AP with the nontransmitted BSSID is located, the non-AP STA may send a probe request frame to an AP with a nontransmitted BSSID in an MBSSID set. In this case, in the MBSSID set, the AP with the transmitted BSSID needs to reply with a probe response frame.

In other words, if a nontransmitted BSSID AP in the MBSSID set receives the probe request frame from the non-AP STA or the non-AP STA MLD, the communication parameter of the nontransmitted BSSID AP may be replied to the non-AP STA or the non-AP STA MLD by using the transmitted BSSID AP. The AP of the nontransmitted BSSID and the AP of the transmitted BSSID may belong to different AP MLDs.

In a second case, if the non-AP STA wants to probe a plurality of AP MLDs at a time, the non-AP STA or the non-AP STA MLD may send a probe request frame to an AP of a transmitted BSSID, to request the AP of the transmitted BSSID to reply with a communication parameter of the nontransmitted BSSID AP. The AP of the nontransmitted BSSID and the AP of the transmitted BSSID may belong to different AP MLDs. When there are a plurality of APs of the nontransmitted BSSID, the APs of the multiple nontransmitted BSSIDs may also belong to different AP MLDs.

In other words, if a transmitted BSSID AP receives the probe request frame from the non-AP STA or the non-AP STA MLD, the transmitted BSSID AP may reply with communication parameters of other nontransmitted BSSID APs in the multiple BSSID set together with or separately to the non-AP STA by using a probe response frame. Alternatively, the transmitted BSSID AP may reply with a communication parameter of another nontransmitted BSSID AP in the multiple BSSID set, and a communication parameter of an AP MLD in which another AP is located to the non-AP STA together with or separately by using the probe response frame, where the another AP is collocated with the transmitted BSSID AP.

In the foregoing two cases, the non-AP STA may carry indication information in the probe request frame, to indicate the communication parameter that the non-AP STA expects to receive from the AP MLD, or may request, in a default manner, the AP MLD to reply with all communication parameters.

4. An MLD Communication Parameter of an AP

In this embodiment, a communication parameter of an AP MLD is information used by a non-AP STA or a non-AP STA MLD to subsequently associate with the AP MLD or information used to establish multi-link communication. The communication parameter of the AP MLD in this embodiment of this application may be communication parameters corresponding to all links supported by the AP MLD, or may be communication parameters corresponding to some links supported by the AP MLD.

In this embodiment, the communication parameter of the AP MLD is also referred to as an association parameter of the AP MLD or complete information of the AP MLD, and refers to complete information of a plurality of links included in the MLD. For each link, the complete information of the link is information that should be carried only when the probe response frame is sent on the link.

Specifically, the communication parameter may include a capability information element, an operation information element, and other information elements, for example, an enhanced distributed channel access parameter set (enhanced distributed channel access, EDCA), high throughput capabilities (HT capabilities), an HT operation, very high throughput capabilities (VHT capabilities), a VHT operation, high efficiency capabilities (HE capabilities), a high efficiency operation (HE operation), extremely high throughput capabilities (extremely high throughput, EHT capabilities), and an EHT operation.

When a frequency band on which a link is located is 6 GHZ, the communication parameter may not include the high throughput capabilities (HT capabilities), the HT operation, the very high throughput capabilities (VHT capabilities), or the VHT operation.

Optionally, the communication parameter further includes:

elements such as timestamp and a beacon frame interval fields (timestamp and Beacon interval fields), a DSSS parameter set, an IBSS parameter set, a country, a channel switch announcement, an extended channel switch announcement, a wide bandwidth channel switch, a transmit power envelope, supported operating classes, IBSS DFS, ERP information, an SIG beacon compatibility (S1G beacon compatibility), a short beacon interval, SIG capabilities (S1G capabilities), and an SIG operation (S1G operation (11ah)).

In an optional embodiment, for the communication parameter of the MLD carried in the probe response frame, only a communication parameter of a link supported by the non-AP MLD may be carried, and for a link not supported by the non-AP MLD, a corresponding communication parameter may not be carried. A non-AP can negotiate with an AP MLD about supported and unsupported links in advance.

By default, the probe response frame needs to carry communication parameters of all links supported by the AP MLD. Certainly, in some implementations, the probe response frame may carry communication parameters of only some links supported by the AP MLD.

In this embodiment of this application, a communication parameter of a link of an AP MLD may also be referred to as a communication parameter of an AP corresponding to the link.

The following describes an implementation process of this application in detail by using embodiments.

Embodiment 1

Figure 5:
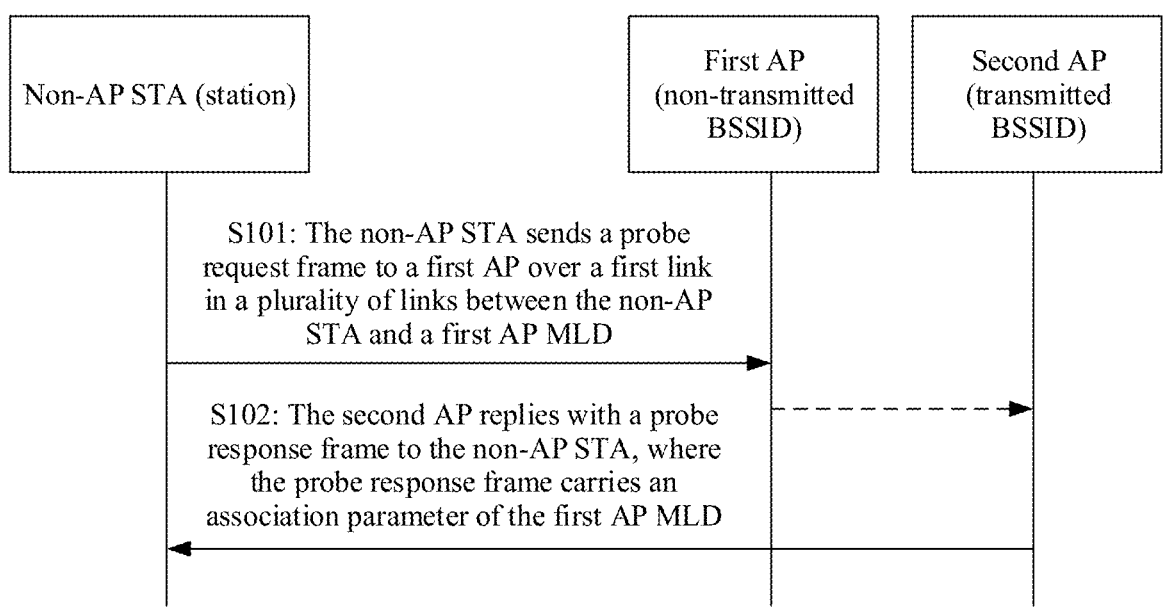
FIG. 5 is a schematic flowchart of a multi-link device probing method in a WLAN according to an embodiment of this application.

FIG. 5 shows a probing method based on a multi-link device and an MBSSID according to an embodiment of this application. The method may be applied between stations, between an access point and a station, and between access points. For ease of description, communication between an access point and a station is used as an example in this embodiment of this application. There are a plurality of links between the access point and the station.

First, a scenario of this embodiment is described. In the scenario, a plurality of AP MLDs are included, for example, a first AP MLD and a second AP MLD. A logical AP of the first AP MLD is a first AP, and is configured as a nontransmitted BSSID. A logical AP of the second AP MLD is referred to as a second AP, and is configured as a transmitted BSSID. The first AP and the second AP may operate on a same link and belong to a same MBSSID set. In this scenario, a non-AP STA (which may be a single-link non-AP STA or a logical non-AP STA in a non-AP STA MLD, which is not limited in this application) obtains a communication parameter of the first AP MLD by using a nontransmitted BSSID AP, to establish a multi-link channel with the first AP MLD. In addition, a plurality of APs or the plurality of AP MLDs in this scenario may be collocated.

A communication parameter of the AP MLD is described in detail in the foregoing fourth point, and details are not described in this embodiment again.

The method includes but is not limited to the following steps.

Step S101: A non-AP STA sends a probe request frame to a first AP over a first link in a plurality of links between the non-AP STA and a first AP MLD.

In an explicit indication manner, the probe request frame carries first indication information, and the first indication information is used to request a communication parameter of the first AP MLD.

In an implicit indication manner, the probe request frame does not carry the first indication information. In other words, the communication parameter of the first AP MLD is requested by default in the implicit indication manner.

Because the first AP is configured as a nontransmitted BSSID, that is, the first AP is a nontransmitted BSSID AP, the first AP cannot directly reply with a probe request response frame to the non-AP STA. Therefore, a second AP that is configured as a transmitted BSSID and that belongs to a same MBSSID set may help the first AP respond to the probe request frame.

Step S102: The second AP replies with the probe response frame to the non-AP STA, where the probe response frame carries the communication parameter of the first AP MLD. Specifically, for the foregoing explicit indication manner or implicit indication manner, the second AP replies with the probe response frame in the non-AP STA, where the probe response frame carries the communication parameter of the first AP MLD.

During implementation of this embodiment of this application, when the non-AP STA wants to request a communication parameter of an AP MLD, the non-AP STA may send a probe request frame to a logical AP of the AP MLD. Even if the logical AP is configured as a nontransmitted BSSID, another transmitted BSSID AP belonging to a same MSSID set may respond to the probe request frame, to reply with the communication parameter of the AP MLD. This can resolve a technical problem in the conventional technology that a communication parameter of an AP MLD on another link cannot be obtained by sending the probe request frame.

For example, in FIG. 4, a non-AP STA wants to learn a communication parameter of an AP MLD 2, to establish a multi-link communication connection to the AP MLD 2. Specifically, the non-AP STA wants to obtain a communication parameter corresponding to a link 1 of the AP MLD 2 and a communication parameter corresponding to a link 2. The non-AP STA sends a probe request frame to an AP 12, where the probe request frame requests, by default, the AP 12 to reply with a communication parameter of the AP MLD 2 in which AP12 is located. Alternatively, the first indication information is carried in the probe request frame, and the first indication information indicates the AP 12 to reply with the communication parameter of the AP MLD 2 in which AP12 is located.

Because a BSSID of the AP 12 is configured as the nontransmitted BSSID, the AP 12 cannot directly reply to the non-AP STA. Therefore, the AP 12 responds to the probe request frame by using the AP 11 that belongs to a same MSSID set 1 as the AP 12. (A BSSID of the AP 11 is configured as a transmitted BSSID.)

The AP 11 carries, in the probe response frame replied to the non-AP STA, the communication parameters of the plurality of links supported by the AP MLD 2. The plurality of links supported by the AP MLD 2 herein may be all links supported by the AP MLD 2, for example, the link 1 and the link 2, or may be some links supported by the AP MLD 2.

Embodiment 2

Figure 6:
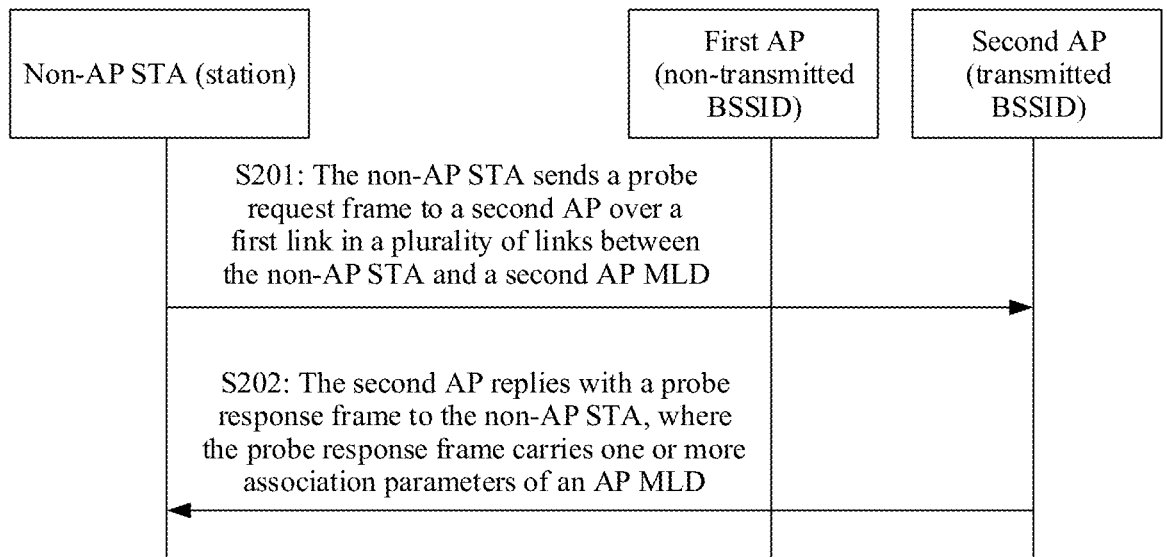
FIG. 6 is another schematic flowchart of a multi-link device probing method in a WLAN according to an embodiment of this application.

FIG. 6 shows a probing method based on a multi-link device and an MBSSID according to an embodiment of this application. The method may be applied between stations, between an access point and a station, and between access points. For ease of description, communication between an access point and a station is used as an example in this embodiment of this application. There are a plurality of links between the access point and the station.

First, an implementation scenario of this embodiment is similar to that of Embodiment 1, and details are not described herein again. A difference from Embodiment 1 lies in that, in Embodiment 2, a non-AP STA wants to obtain a communication parameter of one or more AP MLD by using a transmitted BSSID AP, to separately establish a multi-link channel with the one or more MLDs.

For the communication parameter of the AP MLD in Embodiment 2, refer to the foregoing fourth point. Details are not described again in this embodiment.

The method includes but is not limited to the following steps.

Step S201: A non-AP STA sends a probe request frame to a second AP over a first link in a plurality of links between the non-AP STA and a first AP MLD. The probe request frame is used to request the second AP to carry a communication parameter of an MLD in a probe response frame.

Because the second AP is configured as a transmitted BSSID, that is, the second AP is a transmitted BSSID AP, the second AP may directly reply with a probe request response frame to the non-AP STA.

In an implicit indication manner, a default function of the probe request frame may be as follows.

(1) A default function of the probe request frame is to request a communication parameter of a receiving object of the probe request frame, that is, a communication parameter of a second AP MLD in which the second AP is located. The second AP considers by default that the probe request frame is used to request the communication parameter of the second AP MLD in which the second AP is located.

(2) A second default function of the probe request frame is: The probe request frame is used to request a communication parameter of another MLD other than the second AP MLD in which the second AP is located.

(3) A third default function of the probe request frame is: The probe request frame is used to request a communication parameter of the second AP MLD in which the second AP is located and a communication parameter of another MLD.

Which function in the foregoing three functions is used by the probe request frame by default may be agreed on in a protocol, or may be agreed on between the non-AP STA and the requested AP.

In another explicit indication manner, the probe request frame may further carry second indication information, and the second indication information is used to request a communication parameter on a plurality of links included in an MLD corresponding to the second indication information, that is, request the second AP to carry, in a probe request response frame replied to the non-AP STA, a communication parameter of the plurality of links included in the MLD. Similar to the foregoing implicit indication manner, when the second indication information may be used to request a communication parameter of an AP MLD, the following three cases are also included:

a communication parameter of an AP MLD in which the second AP is located is requested;

a communication parameter of another AP MLD other than the AP MLD in which the second AP is located is requested; and a communication parameter of an AP MLD in which the second AP is located and a communication parameter of another AP MLD are requested.

It should be noted that the "another AP MLD" involved in the foregoing implicit and/or explicit indication manners refers to an AP MLD other than an AP MLD in which the AP is located, or an AP MLD other than the MLD in which the local AP is located, for example, an AP MLD in which another AP belonging to a same MBSSID as the second AP is located, and/or an AP MLD in which another AP sharing a same address with the second AP is located.

In an implementation, the "another MLD" may be an AP MLD in which the second AP is located and another AP MLD in the same MBSSID set to which the second AP belongs.

In an implementation, the "another MLD" may be an AP MLD that is collocated with the second AP except the AP MLD in which the second AP is located.

In an implementation, the "another MLD" may be another AP MLD, except the AP MLD in which the second AP is located, in which another AP belonging to the same MBSSID set as the second AP is located, and an AP MLD that is collocated with the second AP.

The second indication information requests a communication parameter of the another AP MLD. The second indication information may be set to 1 bit, to indicate that the AP MLD in which the second AP is located and the communication parameter of the another AP MLD are requested. The second indication information may be represented as a field "all MLD required".

The "another MLD" herein may be an MLD in which another nontransmitted BSSID AP belonging to the same MBSSID set as the second AP is located, and an AP MLD in which another AP collocated with the second AP is located.

The second indication information may be set to 1 bit, to indicate that a communication parameter of another AP MLD is requested. The second indication information may be represented as a field "other MLD required".

In another implementation, the "another MLD" may be an MLD in which another nontransmitted BSSID AP belonging to the same MBSSID set as the second AP is located. The second indication information may be set to 1 bit, to indicate that a communication parameter of an AP MLD in which the nontransmitted BSSID AP is located is requested. The second indication information may be represented as a field "all nontransmitted MLD required".

In still another implementation, the "another MLD" may be one or more specific MLDs. In this case, the second indication information is carried in the probe request frame, and the second indication information indicates identifiers (ID) or MLD addresses of one or more MLDs. Herein, the MLD identifier may be an MLD MAC address, an MLD index, an MLD ID, or a BSSID index.

It should be noted that, the MLD MAC Address represents a MAC SAP address of the MLD, which is usually 48 bits. A length of the MLD ID is short, which is less than 48 bits, for example, 8 bits or 4 bits. BSSID-index represents a sequence number of a virtual AP in the MBSSID set in which the second AP is located.

In yet another implementation, the non-AP STA may set the second indication information carried in the probe request frame to different values, to request communication parameters of different AP MLDs.

For example, the second indication information is set to a first value, to indicate that only a communication parameter of the AP MLD in which the second AP is located is requested. For example, the second AP is an AP 21, and an AP MLD in which the AP 21 is located is an AP MLD 1.

For another example, the second indication information is set to a second value, which indicates requesting communication parameters of the AP MLD in which the second AP is located and the AP MLD in which the nontransmitted BSSID AP that belongs to the same MBSSID set as the second AP is located. For example, the second AP is the AP 21, the AP 21, an AP 22, and an AP 23 belong to a same MBSSID set 2, and the AP 22 and the AP 23 are configured as nontransmitted BSSIDs. Therefore, the second value represents requesting communication parameters of the AP MLD 1 in which the AP 21 is located, an AP MLD 2 in which the AP 22 is located, and an AP MLD 3 in which the AP 23 is located.

For another example, the second indication information is set to a third value, which indicates requesting a communication parameter of the AP MLD in which the second AP is located and a communication parameter of the AP MLD in which the nontransmitted BSSID AP that belongs to the same MBSSID set as the second AP is located, and/or requesting a communication parameter of an AP MLD in which an AP collocated with the second AP is located. For example, the second AP is the AP 21, all AP MLDs are the AP 21 and AP MLDs in which the AP 22 and the AP23 that belongs to a same MBSSID set 2 as the AP 21 are respectively located, that is the AP MLD 1 in which the AP 21 is located, the AP MLD 2 in which the AP22 is located, and the AP MLD 3 in which the AP23 is located. All AP MLDs further include an AP MLD (not shown in the figure) where an AP that does not belong to a same MBSSID set as the AP21 but is collocated with the AP21 is located (not shown in the figure).

The second indication information may alternatively be set to another value, to indicate a status of a requested communication parameter of the AP MLD.

Step S202: The second AP replies with the probe response frame to the non-AP STA, where the probe response frame carries the communication parameter of the AP MLD.

In the foregoing implicit indication manner, when the second AP receives the probe request frame, that is, a function of the probe request frame is one of the foregoing three default functions, the second AP replies to the probe response frame based on a protocol agreement or an agreement with the non-AP STA. Details are as follows.

(1) For the first default function, the second AP may reply with the probe response frame to the non-AP STA, to carry a communication parameter of the second AP MLD in which the second AP is located.

(2) For the second default function, the second AP may reply with the probe response frame to the non-AP STA by default, to carry a communication parameter of an MLD other than the second AP MLD in which the second AP is located.

(3) The second AP may reply with the probe response frame to the non-AP STA by default, to carry a communication parameter of the second AP MLD in which the second AP is located and a communication parameter of another MLD.

For the foregoing explicit indication manner, when receiving the probe request frame carrying the second indication information, the second AP replies with a corresponding probe response frame based on an indication of the second indication information.

Specifically, the second AP receives the second indication information, parses an MLD identifier carried in the second indication information, and replies with, in the probe response frame, a communication parameter corresponding to the MLD identifier to the non-AP STA.

In an implementation, for the communication parameters of the MLDs of all the other APs that are requested by using the second indication information, the second AP replies with a probe response frame to the non-AP STA in the probe response frame, where the probe response frame carries the communication parameters of the MLDs of all the other APs.

In another implementation, when the second indication information requests a communication parameter of an MLD in which another nontransmitted BSSID AP is located, the second AP replies with the probe response frame to the non-AP STA in the probe response frame, and the probe response frame carries a communication parameter of an MLD in which another nontransmitted BSSID AP is located.

In still another implementation, when the second indication information requests one or more specific MLDs, the second AP replies with a probe response frame to the non-AP STA in the probe response frame, where the probe response frame carries a communication parameter of the MLD corresponding to the MLD identifier indicated by the second indication information.

In yet another implementation, the second indication information may also be set to different values, to indicate that when communication parameters of different AP MLDs are requested, the second AP replies with the probe response frame to the non-AP STA in the probe response frame, where the probe response frame carries the communication parameter of the MLD requested by the second indication information.

For example, for the second indication information that is set to a first value, the second AP feeds back, by using the probe response frame, the communication parameter of the AP MLD in which the second AP is located. For example, the second AP is the AP 21, and the AP 21 feeds back a communication parameter of an AP MLD in which the AP 21 is located, that is, the AP MLD 1.

For another example, for the second indication information that is set to a second value, the second AP feeds back, by using the probe response frame, the AP MLD in which the second AP is located and the communication parameter of the AP MLD in which the nontransmitted BSSID AP that belongs to the same MBSSID set as the second AP is located. For example, the second AP is the AP 21, the AP 21, the AP 22, and the AP 23 belong to the same MBSSID set 2, and the AP 22 and the AP 23 are configured as nontransmitted BSSIDs. Therefore, the AP 21 feeds back communication parameters of the AP MLD 1 in which the AP 21 is located, the AP MLD 2 in which the AP 22 is located, and the AP MLD 3 in which the AP 23 is located.

For another example, the second indication information is set to a third value, and the second AP feeds back communication parameters of all AP MLDs by using the probe response frame. For example, the second AP is the AP 21, and all the AP MLDs are the AP 21 and AP MLDs in which the AP 22 and the AP 23 that belongs to a same MBSSID set 2 as the AP 21 are respectively located. In other words, the AP 21 feeds back communication parameters of the AP MLD 1 in which the AP 23 is located, the AP MLD 2 in which the AP 22 is located, and the AP MLD 3 in which the AP 23 is located.

During implementation of this embodiment of this application, when a non-AP STA wants to request a communication parameter of an AP MLD, the non-AP STA may send a probe request frame to an AP configured as a transmitted BSSID AP. The transmitted BSSID AP may reply a communication parameter of an MLD in which another AP belonging to a same MSSID set is located and/or a communication parameter of an MLD in which another AP collocated with the transmitted BSSID AP is located. Therefore, a technical problem in the conventional technology that the MLD communication parameter of the another AP cannot be obtained by sending the probe request frame is resolved.

Similarly, for example in FIG. 4, a non-AP STA wants to learn communication parameters of one or more AP MLDs, to establish a multi-link communication connection. For example, the AP21 in the MSSID set 2 is configured as a transmitted BSSID, and the AP22 and the AP23 are configured as nontransmitted BSSIDs.

In a first case, if the non-AP STA wants to obtain the communication parameter of the AP MLD 1 in which the AP 21 is located, the non-AP STA sends the probe request frame to the AP 21, where the probe request frame is used to request, by default, the communication parameter of the AP MLD 1 in which the AP 21 is located, or carries the second indication information, which indicates that the communication parameter of the AP MLD 1 in which the AP 21 is located is requested. Because a BSSID of the AP 21 is configured as a transmitted BSSID, the AP 21 may directly reply with the probe response frame, and carry the communication parameter of the AP MLD 1 in the probe response frame. Specifically, the communication parameter of the AP MLD 1 may be communication parameters of a link 1, a link 2, and a link 3 supported by the AP MLD 1, or may be communication parameters of all or some links supported by the non-AP STA.

In a second case, the non-AP STA wants to obtain a communication parameter of an AP MLD other than the AP MLD 1 in which the AP 21 is located, for example, wants to obtain a communication parameter of the AP MLD 2 and/or the AP MLD 3. The non-AP STA sends the probe request frame to the AP 21, where the probe request frame is used to request, by default, a communication parameter of an MLD other than the AP MLD 1 in which the AP 21 is located, or carries the second indication information, to indicate to request the communication parameter of the MLD other than the AP MLD 1 in which the AP 21 is located. Because the BSSID of the AP 21 is configured as the transmitted BSSID, the AP 21 may directly reply with the probe response frame, and carry, in the probe response frame, the communication parameter of the MLD other than the AP MLD 1 in which the AP 21 is located. For example, an MLD identifier indicated by the second indication information is the AP MLD 2 and the AP MLD 3. Alternatively, if the second indication information is "all MLD required", the AP 21 carries communication parameters of the AP MLD 2 and the AP MLD 3 in the probe request response frame. For another example, if the second indication information is "allnontransmitted MLD required", the AP 21 carries the communication parameters of the AP MLD 2 and the AP MLD 3 in the probe request response frame. For another example, if the MLD identifier indicated by the second indication information is the AP MLD 2, the AP 21 carries the communication parameter of the AP MLD 2 in the probe request response frame.

In a third case, the non-AP STA wants to obtain communication parameters of the AP MLD 1 in which the AP 21 is located and another AP MLD, for example, wants to obtain communication parameters of all or some MLDs of the AP MLD 1, the AP MLD 2, and the AP MLD 3. The non-AP STA sends the probe request frame to the AP 21, where the probe request frame is used to request, by default, communication parameters of the AP MLD 1 in which the AP 21 is located and another MLD, or carries the second indication information, to indicate to request the communication parameters of the AP MLD 1 in which the AP 21 is located and the another MLD. Because the BSSID of the AP 21 is configured as the transmitted BSSID, the AP 21 may directly reply with a probe response frame, and carries, in the probe response frame, the AP MLD 1 in which the AP 21 is located and the communication parameter of the another MLD. Specifically, similar to the foregoing description, the AP 21 may carry communication parameters of the AP MLD 1, the AP MLD 2 and/or the AP MLD 3 in the probe response frame based on the indication of the second indication information.

The AP 21 carries, in the probe response frame replied to the non-AP STA, the communication parameters of the plurality of links supported by the one or more AP MLDs.

Embodiment 3

This embodiment of this application further describes several elements that are in a probe request frame and that are used to implement AP MLD probe request. The element may carry the first indication information in Embodiment 1, or carry the second indication information in Embodiment 2. Embodiment 3 further describes an element that is in a probe response frame and that is used to carry a communication parameter of an AP MLD.

A probe request frame in this embodiment includes a plurality of types of the following fields:

TABLE 4

| No. | Information |
|---|---|
| 1 | HT capabilities (HT capabilities) |
| 2 | VHT capabilities (VHT capabilities). This field does not exist when a frequency band is 6 GHz. |
| 3 | HE capabilities (HE capabilities) |
| 4 | EHT capabilities (EHT capabilities) |
| 5 | Known BSSID (known BSSID) |
| 6 | HE 6 GHz frequency band capabilities (HE 6 GHz band capabilities) |
| 7 | Short SSID list (short SSID list) |

TABLE 4-continued

| No. | Information |
| --- | --- |
| 8 | Requested MLD element (requested MLD element) |
| 9 | Multi-link element (multi-link element) |
| 10 | Known MLD element (known MLD element) |
| 11 | MLD address or MLD identifier (MLD address or MLD ID) |
| 12 | BSSID index bitmap (BSSID index bitmap) |

In the explicit indication manner in the foregoing embodiment, the first indication information and the second indication information may be implemented in various forms. For example, the first indication information and the second indication information may be carried in the probe request frame as separate elements, for example, a multi-link element and a requested MLD element. Alternatively, a known MLD element may be carried in the probe request frame in a form of an MLD address, an MLD identifier, or a BSSID index bitmap for indication. This is described in detail below.

(1) First, a specific implementation of a signaling structure of the multi-link element is described. The multi-link element may be used in the foregoing Embodiment 1 and Embodiment 2.

Figure 7A:
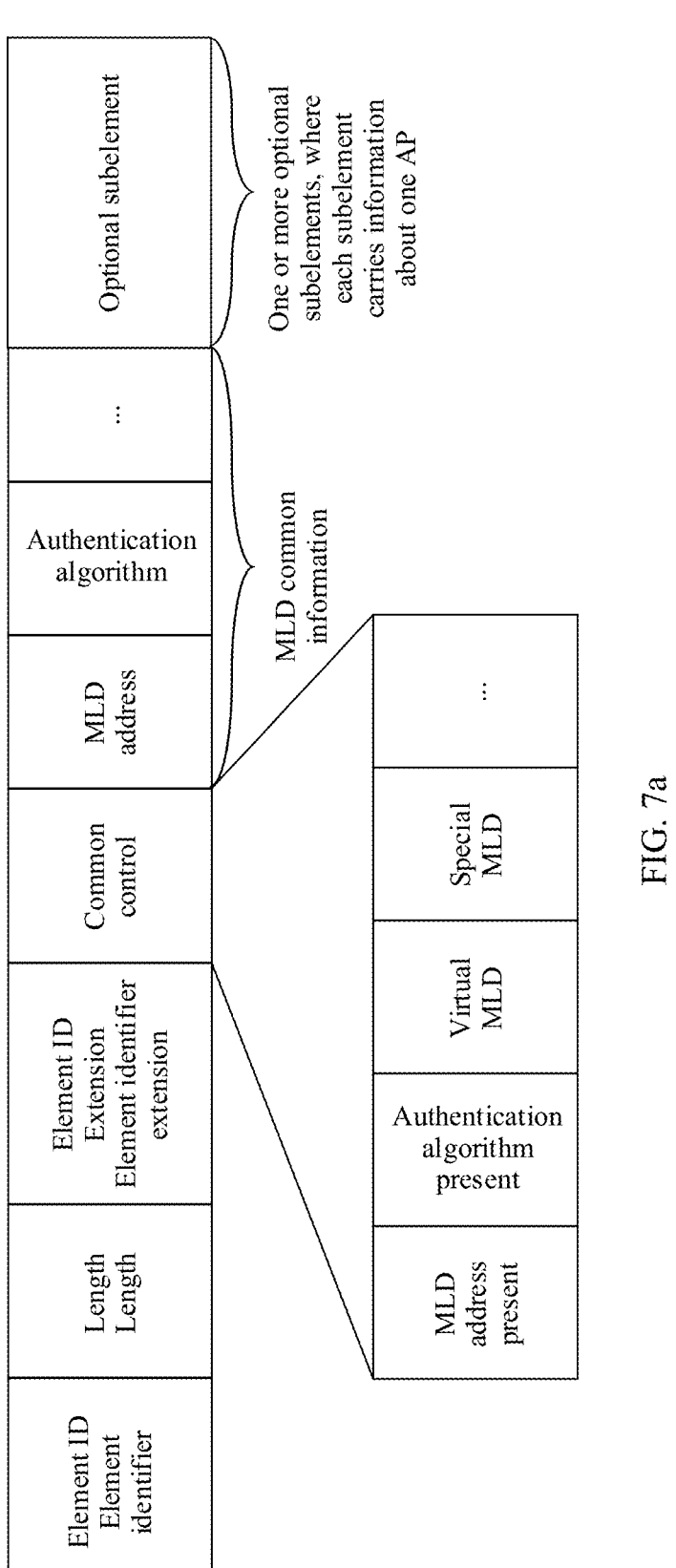
FIG. 7a to FIG. 7d are schematic diagrams of structures of multi-link elements according to an embodiment of this application.

According to a flexible signaling structure provided in this embodiment, a probe request frame sent by a non-AP STA carries the multi-link element, to request a communication parameter of an AP MLD. Alternatively, one or more multi-link elements are carried in the probe request frame sent by the non-AP STA, to request communication parameters of a plurality of AP MLDs. Specifically, one piece of indication information may be carried in one multi-link element to request the communication parameters of the plurality of AP MLDs, or a plurality of pieces of indication information may be respectively carried in a plurality of multi-link elements to request the communication parameters of the plurality of AP MLDs. In another implementation, one multi-link element (carrying no indication information) may be used to request the communication parameters of the plurality of AP MLDs, or a plurality of multi-link elements (carrying no indication information) may be used to request the communication parameters of the plurality of AP MLDs FIG. 7a is a schematic diagram of a structure of a multi-link element. The multi-link element includes an element identifier, a length, an element identifier extension field, a common control field, an MLD common information field, and one or more optional subelements. The common control field includes a virtual MLD field and a special MLD field. Optionally, the common control field further includes an MLD address present field. The MLD common information field includes an MLD address field. Optionally, the common control field further includes an authentication algorithm present field, to indicate whether there is an authentication algorithm field in the MLD common information field.

Figure 7B:
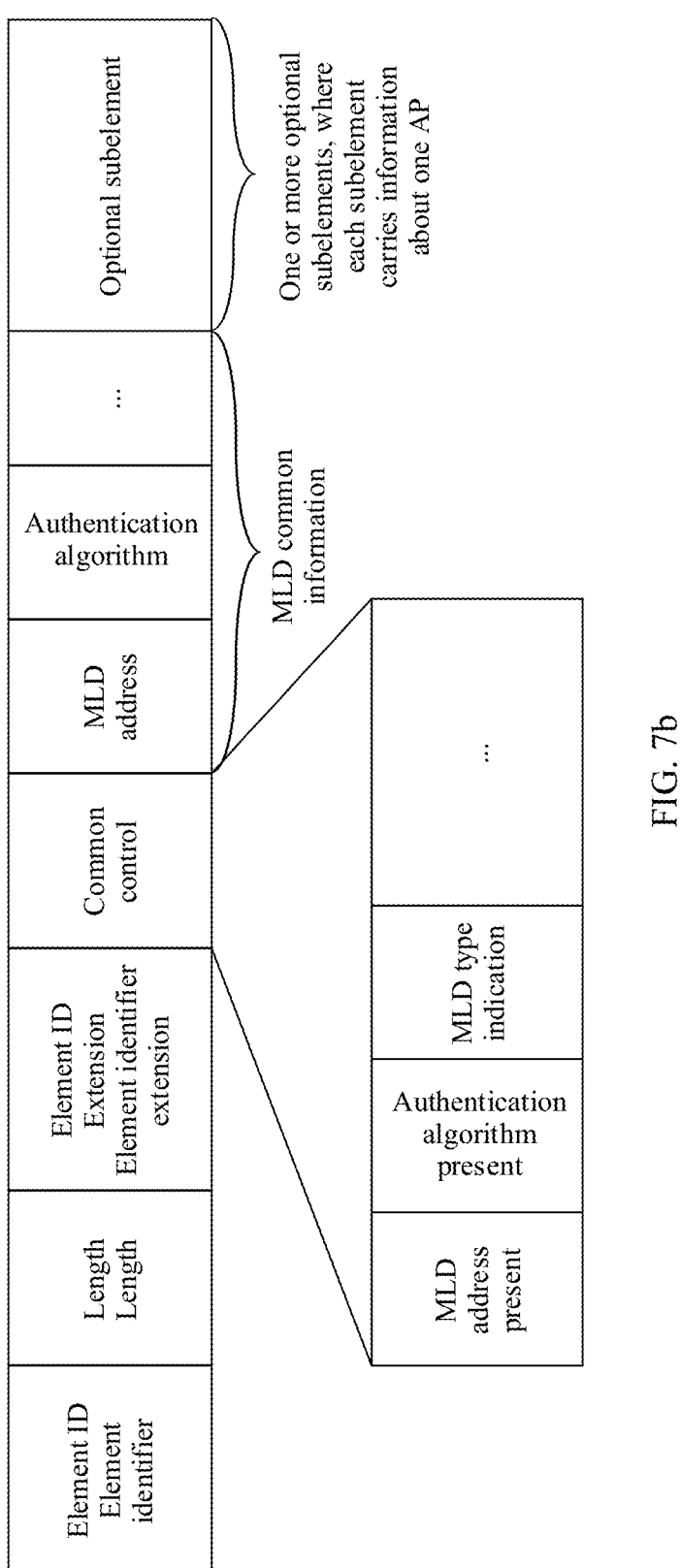

FIG. 7b is a schematic diagram of a structure of another multi-link element. The multi-link element includes an element identifier, a length, an element identifier extension field, a common control field, an MLD common information field, and one or more optional subelements. The common control field includes an MLD type indication. Optionally, the MLD common control field further includes an MLD address present field. The MLD common information field includes an MLD address field. Optionally, the common control field further includes an authentication algorithm present field, to indicate whether there is an authentication algorithm field in the MLD common information field.

Figure 7C:
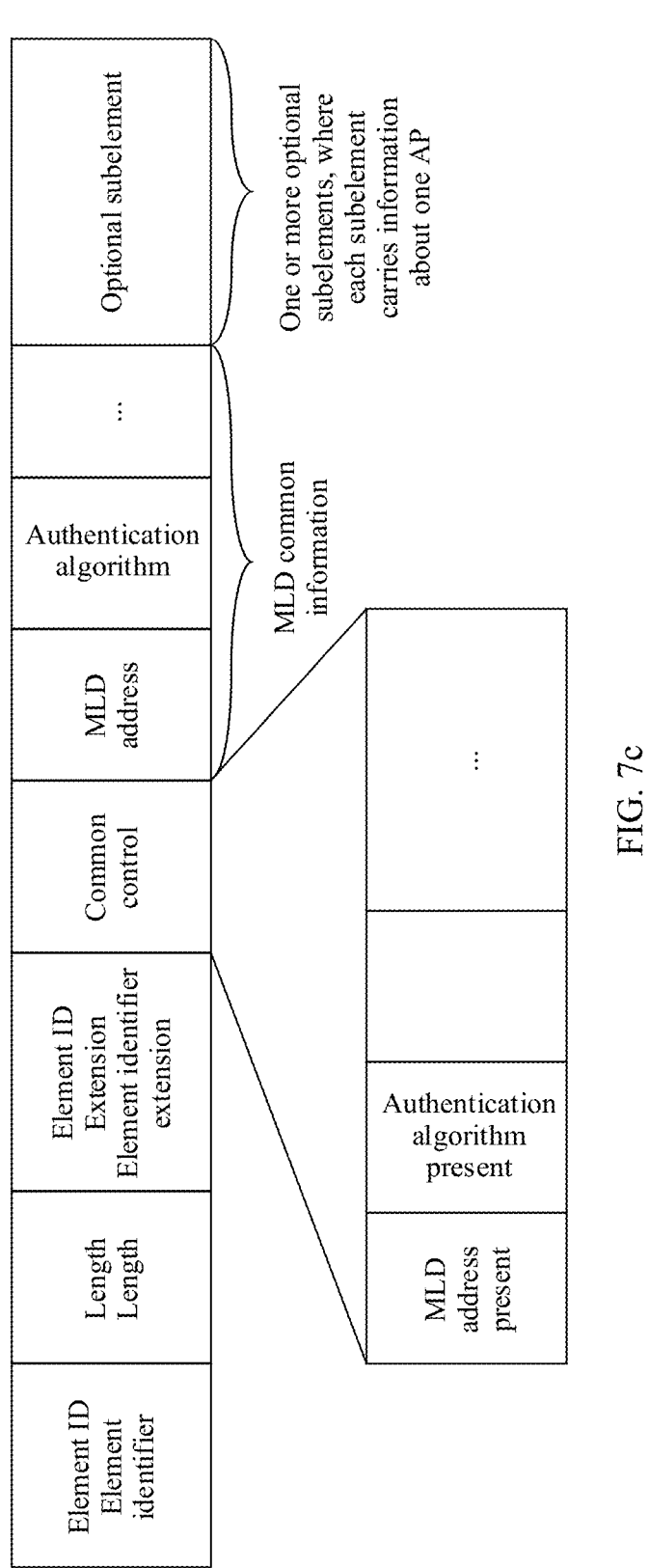

FIG. 7c is a schematic diagram of a structure of still another multi-link element. The multi-link element includes an element identifier, a length, an element identifier extension field, a common control field, an MLD common information field, and one or more optional subelements. The common control field includes an MLD address present field. The MLD common information field includes an MLD address field. Optionally, the common control field further includes an authentication algorithm present field, to indicate whether there is an authentication algorithm field in the MLD common information field.

Figure 7D:
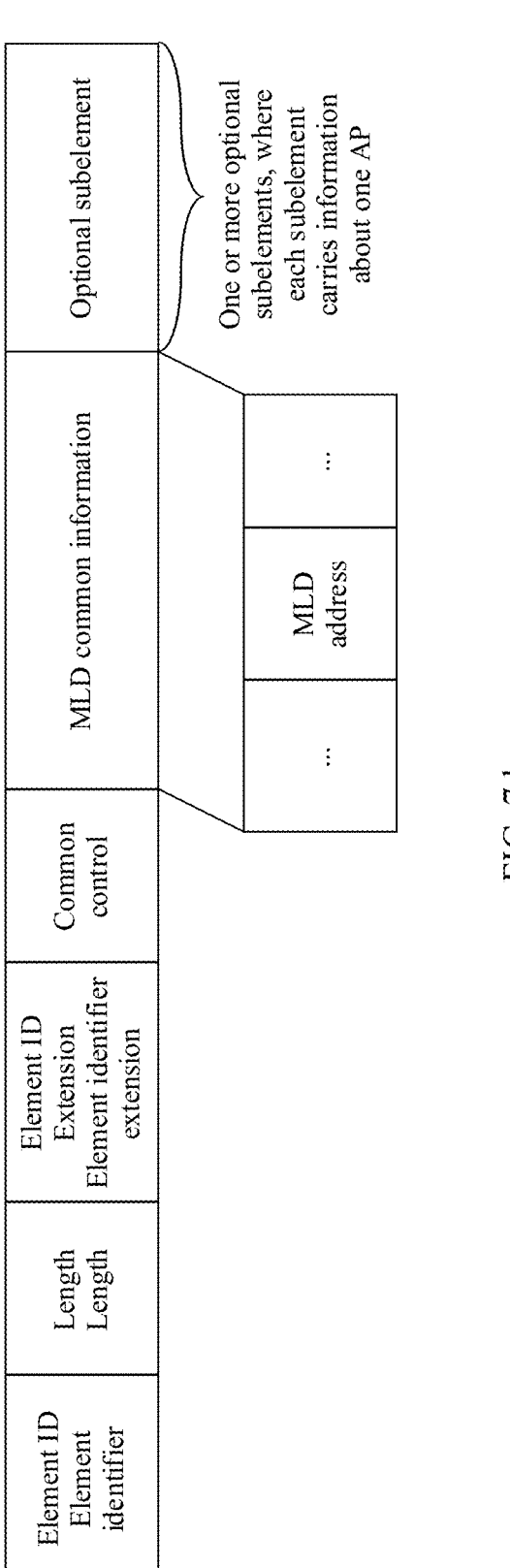

FIG. 7d is a schematic diagram of a structure of yet another multi-link element. The multi-link element includes an element identifier, a length, an element identifier extension field, a common control field, an MLD common information field, and one or more optional subelements. The MLD common information field includes an MLD address field.

Each of the foregoing four possible structures of the multi-link element includes one or more optional subelements, and one optional subelement describes information about one AP in the AP MLD. The optional subelement may be referred to as a link configuration element link profile element or a link profile subelement link profile subelement, and the link profile subelement or the link profile element carries a communication parameter of an AP. Alternatively, the link profile subelement or the link profile element carries a communication parameter of a link.

In this embodiment of this application, the link profile subelement or the link profile element carried in the probe request frame indicates the communication parameter of the AP or the link that requests an AP MLD. The link profile subelement or the link profile element carried in the probe response frame is used to carry the communication parameter of the AP of the AP MLD or the link.

When the multi-link element does not carry the link profile subelement or the link profile element, it indicates, by default, that communication parameters of all APs or all links in the entire AP MLD are requested or responded to.

It should be understood that the foregoing four structures of the multi-link element are merely examples. A field or a subfield in the multi-link element may be deleted or added, and a name of the multi-link element may be another synonym name. In a standard formulation or technical development process, another structure may further exist. This is not limited in this application.

Figure 8:
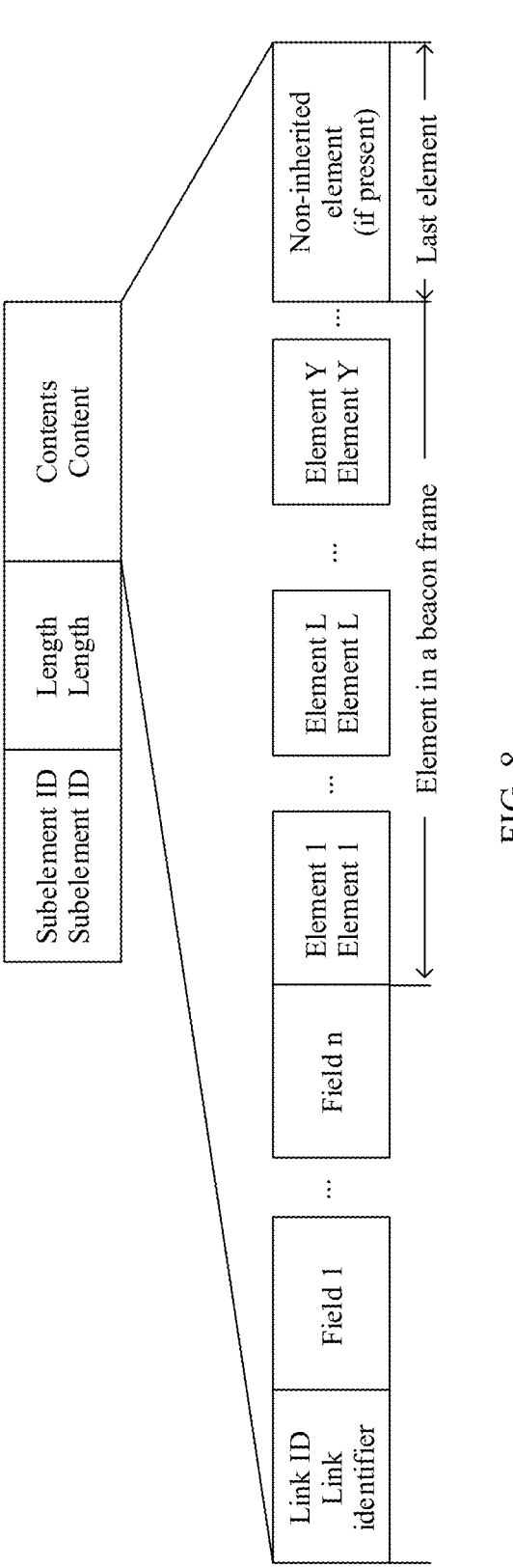
FIG. 8 is a schematic diagram of a structure of a subelement in a multilink element according to an embodiment of this application.

As shown in FIG. 8, content of each optional subelement includes a link identifier of an AP. Optionally, each optional subelement further includes an AP-related field, for example, an SSID field, a timestamp field, a beacon interval field, and an element of the AP. The element of the AP is, for example, a BSS load element, an EHT capability element, or an EHT operation element.

In Embodiment 1, the explicit indication manner is used. When a non-AP STA wants to request a communication parameter of a first AP MLD, the non-AP STA may send a probe request frame to a logical AP of the first AP MLD, where the logical AP is configured as a nontransmitted BSSID. The non-AP STA may carry first indication information in the probe request frame, where the first indication information is used to request the communication parameter of the first AP MLD. The first indication information may be an "MLD complete information required in probe response (MLD complete info required in probe response)" field.

Figure 9A:
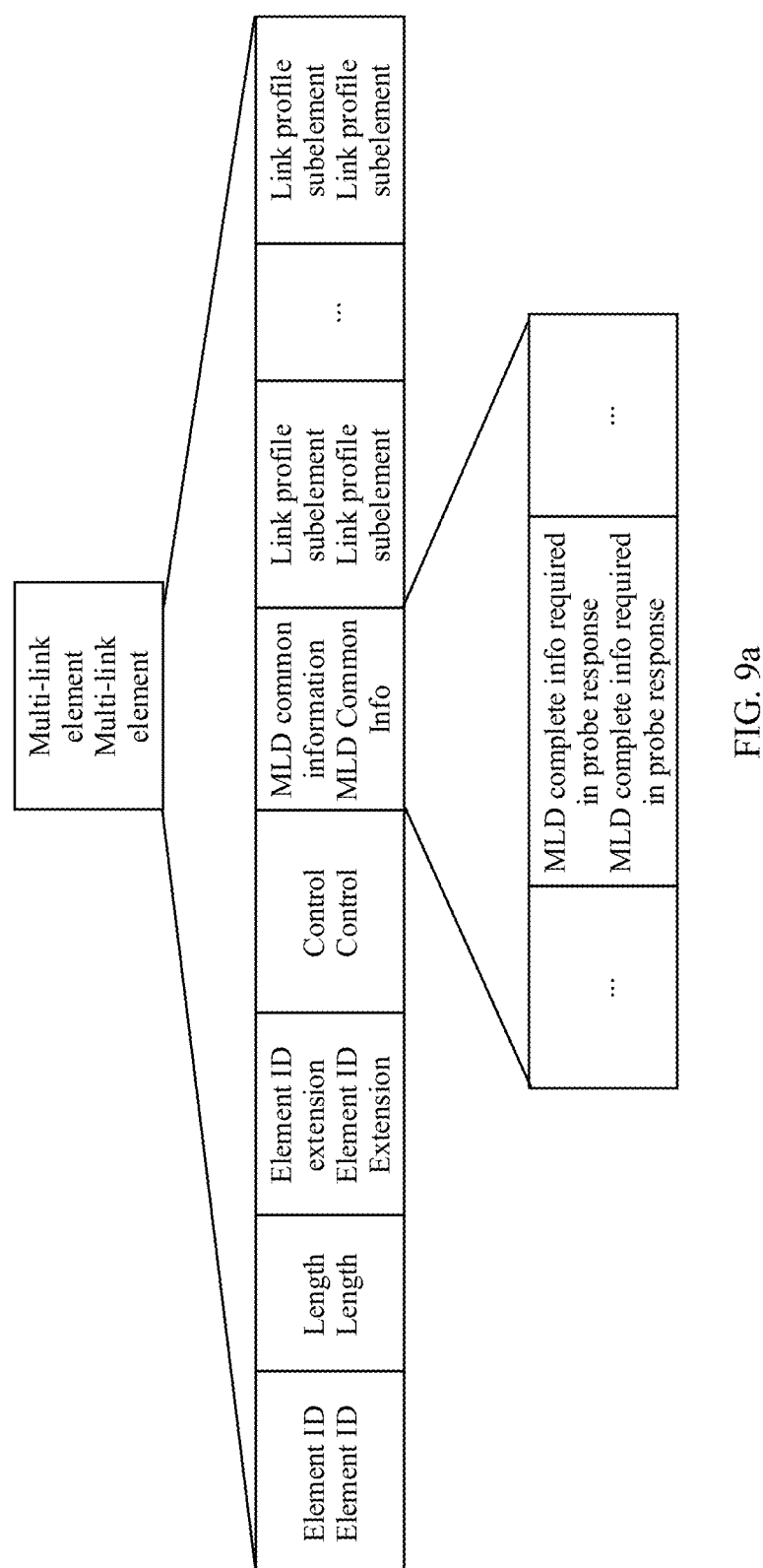
FIG. 9a to FIG. 9e are schematic diagrams of structures of several multilink elements according to an embodiment of this application.

In an implementation, as shown in FIG. 9a, the multi-link element includes fields such as an element ID, a length, an element ID extension, a control, and multi-link device common information (MLD common info), and a link profile subelement. The multi-link device common information field includes the "MLD complete info required in probe response" field. It should be noted that the field name herein is only an example, and another name may be used during standard formulation or product implementation.

The "MLD complete info required in probe response" may be indicated by using one bit, for example, 1 indicates a request is made, and 0 indicates no request is made.

In this embodiment, an example in which the field may be carried in an MLD common information field of the multi-link element is used for description. In another implementation, the field may alternatively be carried in another field, for example, a control field. Details are not described herein.

In addition, in another implementation, the MLD complete info required in probe response field may be further carried in any multi-link element shown in 7a to 7d. A function of the multi-link element is similar to that of 9a, and details are not described herein again.

Figure 9B:
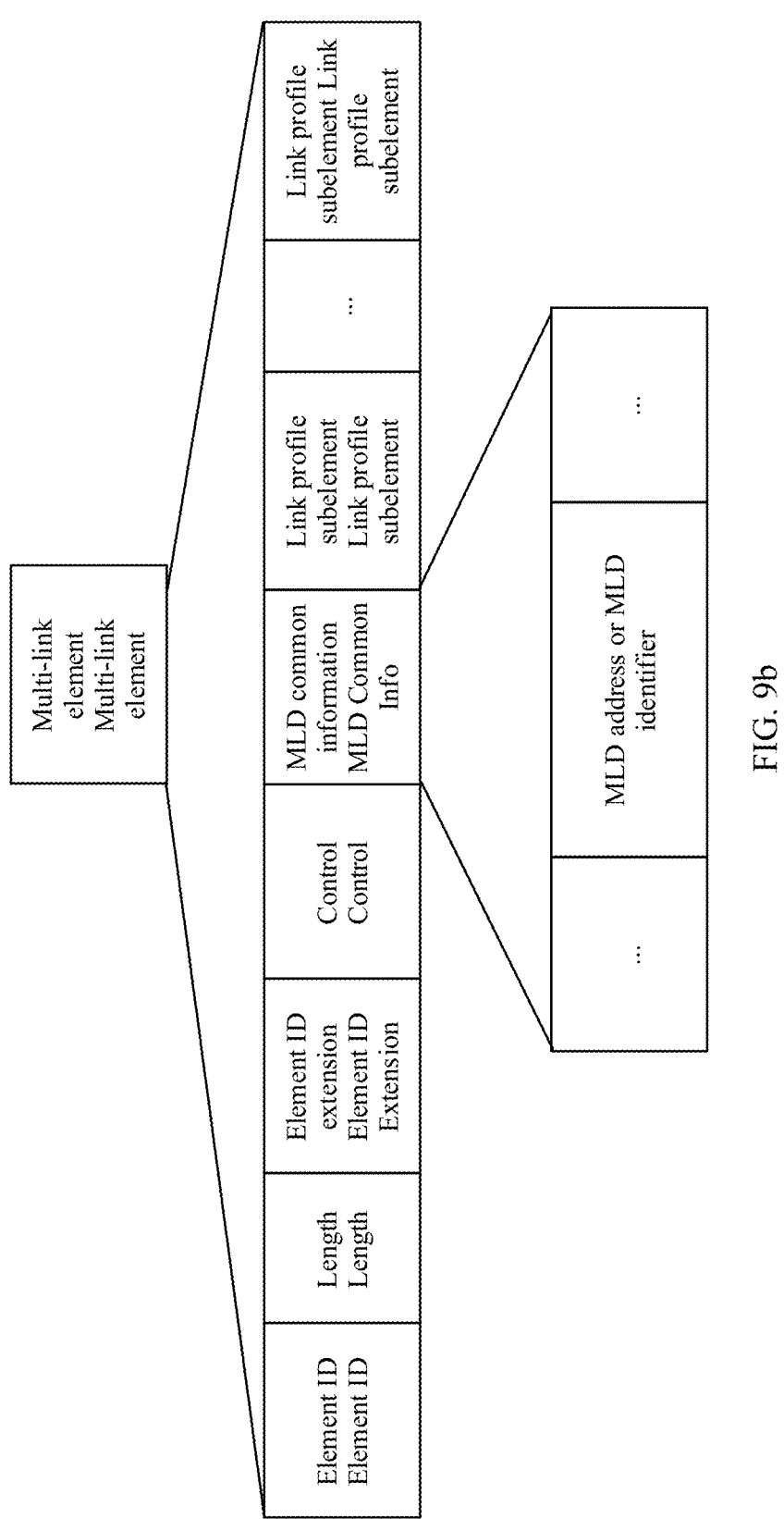

In another implementation, as shown in FIG. 9b, the multi-link element includes fields such as an element ID, a length, an element ID extension, a control, and multi-link device common information (MLD common info), and a link profile subelement. The multi-link device common information field includes the "MLD address or MLD identifier" field. It should be noted that the field name herein is only an example, and another name may be used during standard formulation or product implementation.

The "MLD address or MLD identifier" indicates the AP MLD requested by the non-AP STA, and the link profile subelement indicates a link of the requested AP MLD. An AP responsible for responding to the probe request frame replies to the AP MLD corresponding to the "MLD address or MLD identifier", and replies with the communication parameter of the link corresponding to the link profile subelement.

In Embodiment 2, an explicit indication manner is used.

In one case, when a non-AP STA requests only a communication parameter of an AP MLD in which a second AP is located, a probe request frame carries second indication information, and the second indication information may be carried in the multi-link element shown in FIG. 7a to FIG. 7c. Specifically, an MLD address in the multi-link element may be set to an address of the AP MLD in which the second AP is located, indicating that the second indication information requests a communication parameter of the AP MLD in which the second AP is located.

In still another case, the non-AP STA requests a communication parameter of another AP MLD other than the second AP MLD in which the second AP is located, and the probe request frame may carry THE second indication information, which is specifically a multi-link element.

Figure 9C:
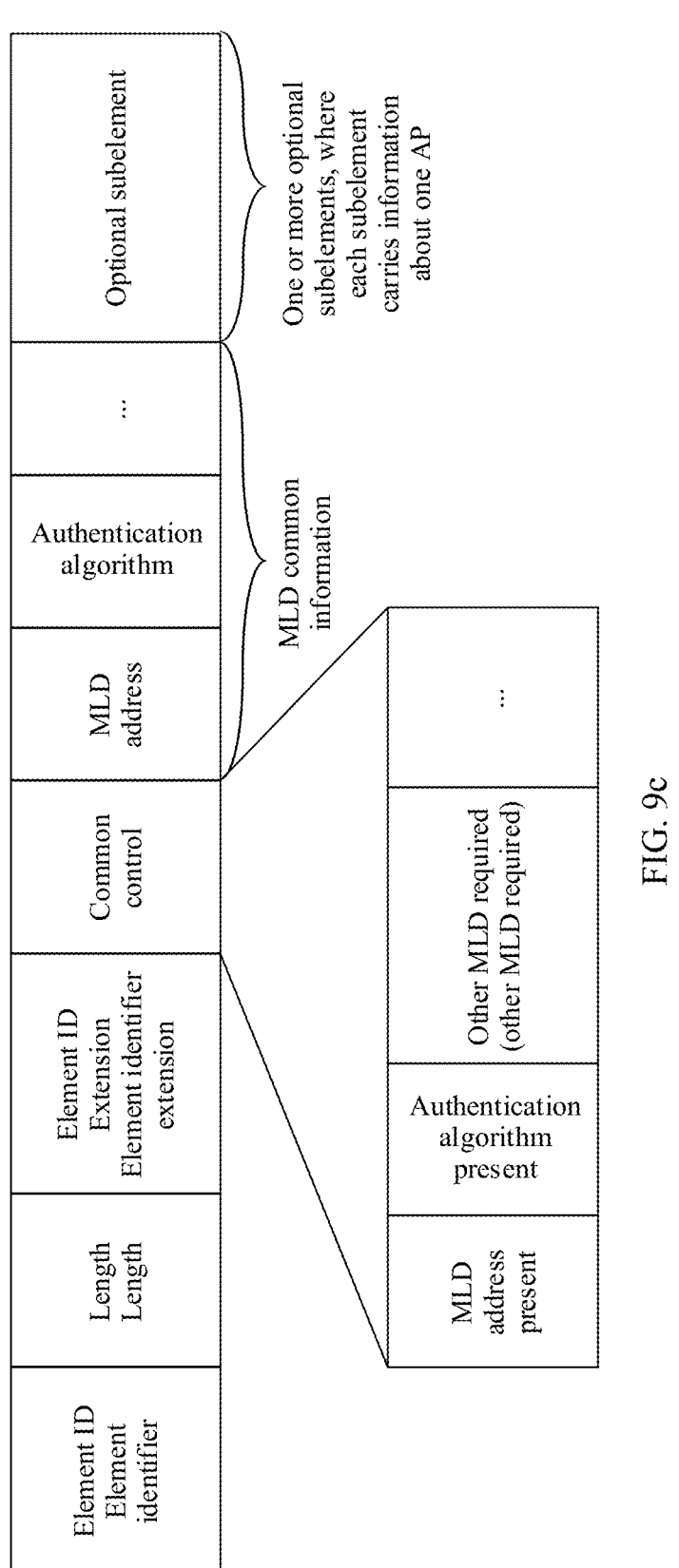

The multi-link element may be shown in FIG. 9c. An "other MLD required" field included in the multi-link element indicates whether to request the communication parameter of the another MLD other than the second AP MLD in which the second AP is located. The second AP that receives the probe request frame feeds back, by default, to a non-AP MLD, a communication parameter of an AP MLD other than the AP MLD in which the second AP is located. In this manner, another AP MLD includes an AP MLD in which another nontransmitted BSSID AP belonging to a same MBSSID set as the second AP is located and/or an AP MLD in which another AP collocated with the second AP is located.

In the "other MLD required" field, 1 bit may be used to indicate whether a request is made. For example, 1 indicates that a request is made, and 0 indicates that no request is made.

Figure 9D:
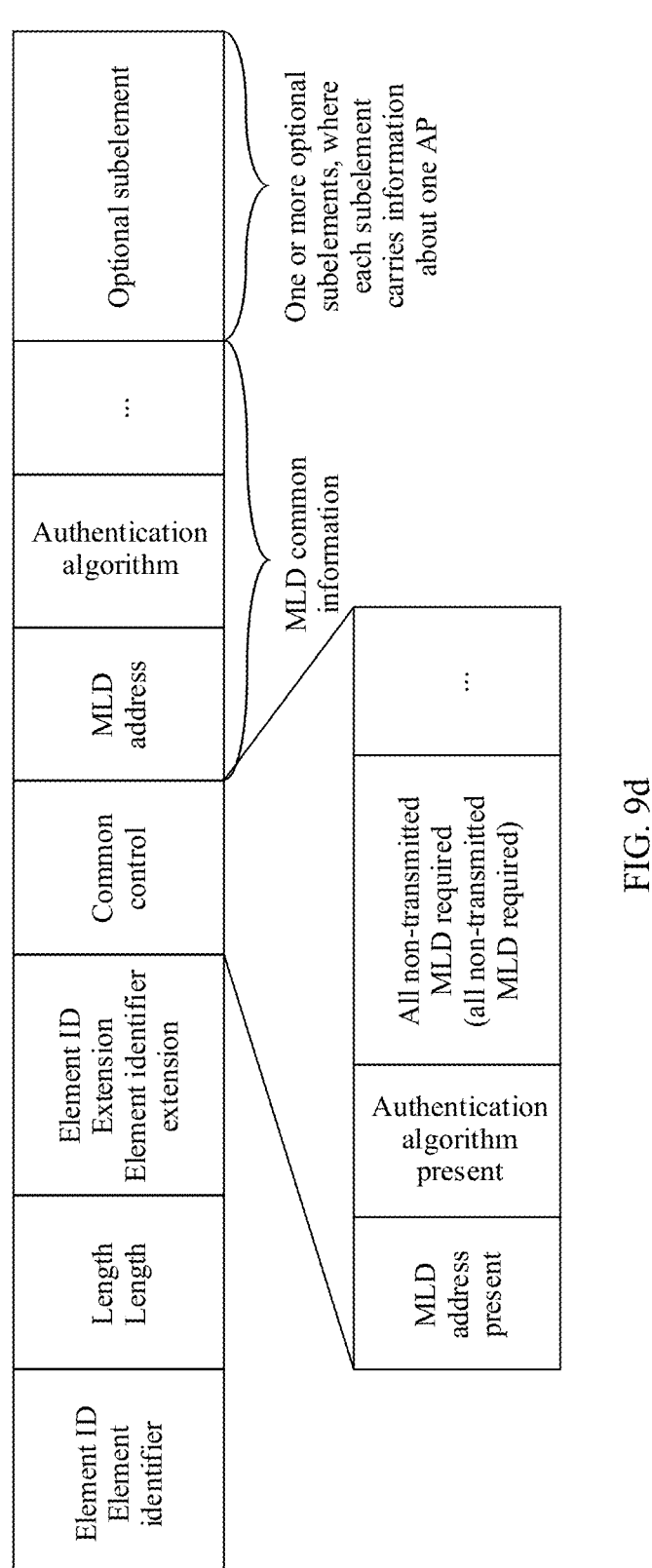

Alternatively, the multi-link element may be shown in FIG. 9d. An "all nontransmitted MLD required" field included in the multi-link element indicates, by default, that a communication parameter of an AP MLD in which another nontransmitted BSSID AP belonging to the same MBBID set as the second AP is located, other than the second AP MLD of in which the second AP is located is requested. The second AP receiving the probe request frame feeds back, by default, to the non-AP MLD, a communication parameter of another nontransmitted BSSID AP MLD other than AP MLD in which the second AP is located. In the "all nontransmitted MLD required" field, 1 bit may be used to indicate whether a request is made. For example, 1 indicates that a request is made, and 0 indicates that no request is made.

Figure 9E:
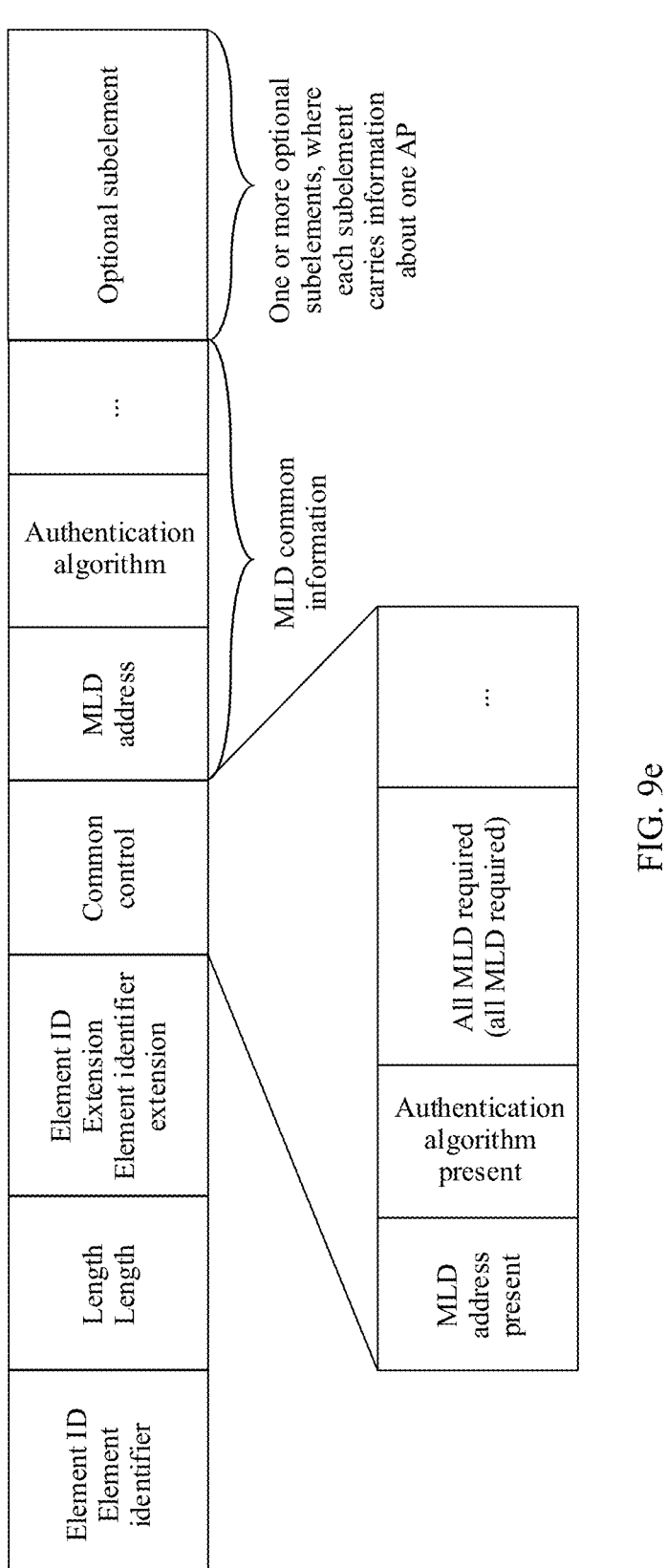

In still another case, the non-AP STA requests communication parameters of the second AP MLD in which the second AP is located and another AP MLD. The probe request frame may carry the second indication information, which is specifically the multi-link element. The multi-link element may be shown in FIG. 9e. An "all MLD required" field included in the multi-link element indicates, by default, that the communication parameters of the second AP MLD in which the second AP is located and the another AP MLD are requested. The second AP receiving the probe request frame feeds back, by default, to the non-AP MLD, the communication parameters of the second AP MLD in which the second AP is located and the another AP MLD In one manner, the "all MLD required" request includes communication parameters of the second AP and an AP MLD in which another nontransmitted BSSID AP belonging to a same MBSSID set as the second AP is located.

In another manner, the "all MLD required" request includes communication parameters of the second AP and an AP MLD in which another AP collocated with the second AP is located.

In still another manner, the "all MLD required" request includes the second AP and the AP MLD in which the another nontransmitted BSSID AP belonging to the same MBSSID set as the second AP is located, and the AP MLD in which the another AP collocated with the second AP is located.

Similarly, the "all MLD required" may be indicated by using one bit, for example, 1 indicates a request is made, and 0 indicates no request is made.

When the non-AP STA requests the communication parameter of the second AP MLD which the second AP is located and the communication parameter of the another MLD, an "other MLD required" field shown in FIG. 9c may be further used. In addition, this is implemented by setting an MLD address or an MLD identifier in the multi-link element of the probe request frame to an address or an identifier of the second AP.

The foregoing uses a specific field to indicate the requested AP MLD, and the multi-link element may carry an MLD address or an MLD identifier. In this case, the MLD address or the MLD identifier indicates an address of an MLD in which the second AP receiving the probe request frame is located.

In another case, the non-AP STA wants to obtain a communication parameter of one or more specific AP MLDs by using the probe request frame. In this implementation, the one or more AP MLDs may be the AP MLD in which the second AP is located, or one or more of AP MLDs in which other APs that belong to the same MBSSID set as the second AP are located, or one or more of AP MLDs where other APs collocated with the second AP are located.

In an implementation, the second indication information is the MLD identifier or the MLD address, and the MLD identifier or the MLD address indicates one or more MLDs. Herein, the MLD identifier or the MLD address may be specifically an MLD MAC address, an MLD index, an MLD ID, or a BSSID index.

For example, the MLD identifier or the MLD address is carried in the probe request frame (in this case, the multi-link element does not need to be carried).

For another example, the MLD identifier or the MLD address is carried in the multi-link element in the probe request frame.

In the foregoing two manners, that the non-AP STA wants to obtain a communication parameter of an AP MLD by using a probe request frame may be implemented by using the probe request frame or the multi-link element in the probe request frame. Specifically, the probe request frame, or the MLD address or the MLD identifier in the multi-link element in the probe request frame is set to an address or an identifier of the AP MLD that the probe request frame needs to request.

The non-AP STA may want to obtain communication parameters of a plurality of AP MLDs by using the probe request frame by carrying a plurality of MLD addresses or identifiers in the probe request frame, or by carrying a plurality of MLD addresses or identifiers in one multi-link element in the probe request frame, or respectively carrying a plurality of MLD addresses or identifiers in a plurality of multi-link elements in the probe request frame.

In another implementation, the second indication information is a BSSID index bitmap, and each bit of the BSSID index bitmap corresponds to one AP MLD. A corresponding bit is set to 0 or 1 to indicate whether to request a communication parameter of an AP MLD corresponding to the corresponding bit.

For example, the BSSID index bitmap is carried in the probe request frame (in this case, the multi-link element does not need to be carried).

For still another example, the BSSID index bitmap is carried in the multi-link element in the probe request frame.

In the foregoing two examples, that the non-AP STA wants to obtain a communication parameter of an AP MLD by using the probe request frame may be implemented by using the probe request frame or the multi-link element in the probe request frame. Specifically, the probe request frame or a corresponding bit in a BSSID index bitmap in the multi-link element in the probe request frame is set to 1 to indicate a to-be-requested AP MLD.

(2) The following describes a specific implementation of a signaling structure of a requested MLD element. The requested MLD element may be used in the foregoing Embodiment 1 and Embodiment 2.

In this embodiment, one or more requested MLD elements are carried in a probe request frame sent by a non-AP STA, to request a communication parameter of an AP MLD.

Figure 11A:
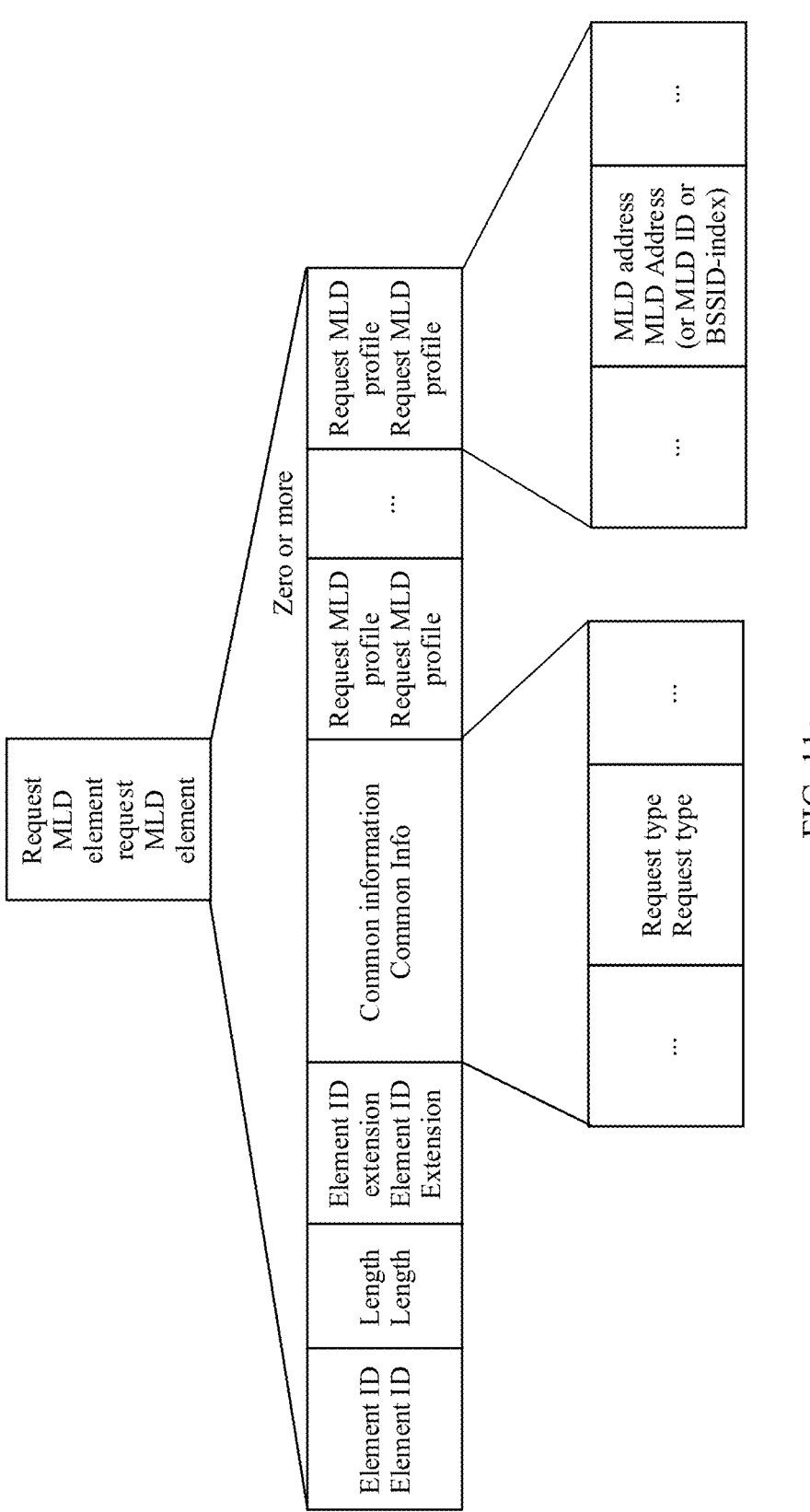
FIG. 11a and FIG. 11b are schematic diagrams of structures of request MLD elements according to an embodiment of this application.

As shown in FIG. 11a, the requested MLD element includes fields such as "element ID", "length", "element ID extension", "common information", and "request MLD configuration". The "common information" field includes a "request type" subfield.

In an implementation, the "request MLD configuration" indicates requested communication parameters of different AP MLDs. In this case, the "request type field" may alternatively not exist.

Specifically, the "request MLD configuration" includes an "MLD address" field. The "MLD address" indicates a requested address of an AP MLD. The "MLD address" may also be equivalent to an "MLD identifier". The MLD identifier indicates one or more MLDs. Herein, the "MLD address" and the "MLD identifier" may be an MLD MAC address, an MLD index, an MLD ID, or a BSSID index.

In another implementation, the "request type field" indicates requested communication parameters of different AP MLDs. In this case, the "MLD configuration request" field is not required, or a quantity of "MLD configuration request" fields is zero.

Specifically, the "request type" in the requested MLD element may be set to different values to indicate requesting for the communication parameters of different AP MLDs. Using the first indication information in Embodiment 1 as an example, the request type may be set to 1 bit.

Manner 1: A value of the 1 bit is 1, indicating that a communication parameter of an AP MLD in which a first AP is located is requested, and 0 indicates that only a communication parameter of the first AP is requested.

Using the second indication information in Embodiment 2 as an example, the request type may be set to 1 bit or a plurality of bits.

(1) When the request type is indicated by 1 bit:

Manner 1: When a value of the 1 bit is 1, it indicates that a communication parameter of an AP MLD in which a second AP is located is requested, and when a value of the 1 bit is 0, it indicates that only a communication parameter of the second AP is requested.

Manner 2: When the value of the 1 bit is 1, it indicates that the communication parameter of the AP MLD in which the second AP is located and a communication parameter of another AP MLD in which another AP belonging to a same MBSSID set as the second AP is located are requested, and 0 indicates that only the communication parameter of the second AP is requested.

Manner 3: When the value of the 1 bit is 1, it indicates that the communication parameter of the AP MLD in which the second AP is located and the communication parameter of the another AP MLD are requested, and 0 indicates that only the communication parameter of the second AP is requested. The "another AP MLD" herein includes an AP MLD in which another nontransmitted BSSID AP belonging to the same MBSSID set as the second AP is located and/or an AP MLD in which another AP collocated with the second AP is located.

Manner 4: When the value of the 1 bit is 1, it indicates that the AP MLD in which the second AP is located is requested, and 0 indicates that the communication parameter (excluding the AP MLD in which the second AP is located) of the another AP MLD in the same MBSSID set as the second AP is requested.

Manner 5: When the value of the 1 bit is 1, it indicates that the AP MLD in which the second AP is located is requested, and 0 indicates that the communication parameter of the another AP MLD is requested. The "another AP MLD" herein includes an AP MLD in which another nontransmitted BSSID AP belonging to the same MBSSID set as the second AP is located and the AP MLD in which the another AP collocated with the second AP is located.

Manner 6: When the value of the 1 bit is 1, it indicates that the AP MLD in which the second AP is located is requested, and 0 indicates that the communication parameter of the another AP MLD is requested. The "another AP MLD" herein includes the AP MLD in which the another AP collocated with the second AP is located.

The foregoing is merely an example. A case of indication by using the 1 bit may alternatively be a variation or a combination of the foregoing.

(2) When the request type is indicated by using a plurality of bits, for example, 3 bits, the request type may have eight values in total.

A first value indicates that only the communication parameter of the second AP is requested.

A second value indicates the communication parameter of the AP MLD in which the second AP is located is requested.

A third value indicates the communication parameter of the AP MLD in which the second AP is located and the communication parameter of the another AP MLD in which the another AP belonging to the same MBSSID set as the second AP is located.

A fourth value indicates that the communication parameter of the another AP MLD in which the another AP belonging to the same MBSSID set as the second AP is located other than the AP MLD in which the second AP is located is requested.

A fifth value indicates that the communication parameter of the AP MLD in which the second AP is located and the communication parameter of the another AP MLD are requested. The "another AP MLD" herein includes the AP MLD in which the another AP collocated with the second AP is located.

A sixth value indicates that the communication parameter of the another AP MLD other than the AP MLD in which the second AP is located is requested. The "another AP MLD" herein includes the AP MLD in which the another AP collocated with the second AP is located.

A seventh value indicates that the communication parameter of the AP MLD in which the second AP is located and the communication parameter of the another AP MLD are requested. The "another AP MLD" herein includes the AP MLD in which the another nontransmitted BSSID AP belonging to the same MBSSID set as the second AP is located and the AP MLD in which the another AP collocated with the second AP is located.

An eighth value indicates that the communication parameter of the another AP MLD other than the AP MLD in which the second AP is located is requested. The "another AP MLD" herein includes the AP MLD in which the another nontransmitted BSSID AP belonging to the same MBSSID set as the second AP is located and the AP MLD in which the another AP collocated with the second AP is located.

Certainly, the first value and the eighth value may use only some of the parameters, or two bits are used to indicate some of the parameters In this embodiment, an example in which the request type field is carried in a common information field of the requested MLD element is used for description. In another implementation, the request type field may be further carried in another field, for example, a control field. Details are not described herein.

FIG. 11a is merely an example. In a standard formulation or technology evolution process, a name of the requested MLD element or a field included in the requested MLD element may alternatively be implemented in another manner. This is not limited in this embodiment of this application.

Figure 11B:
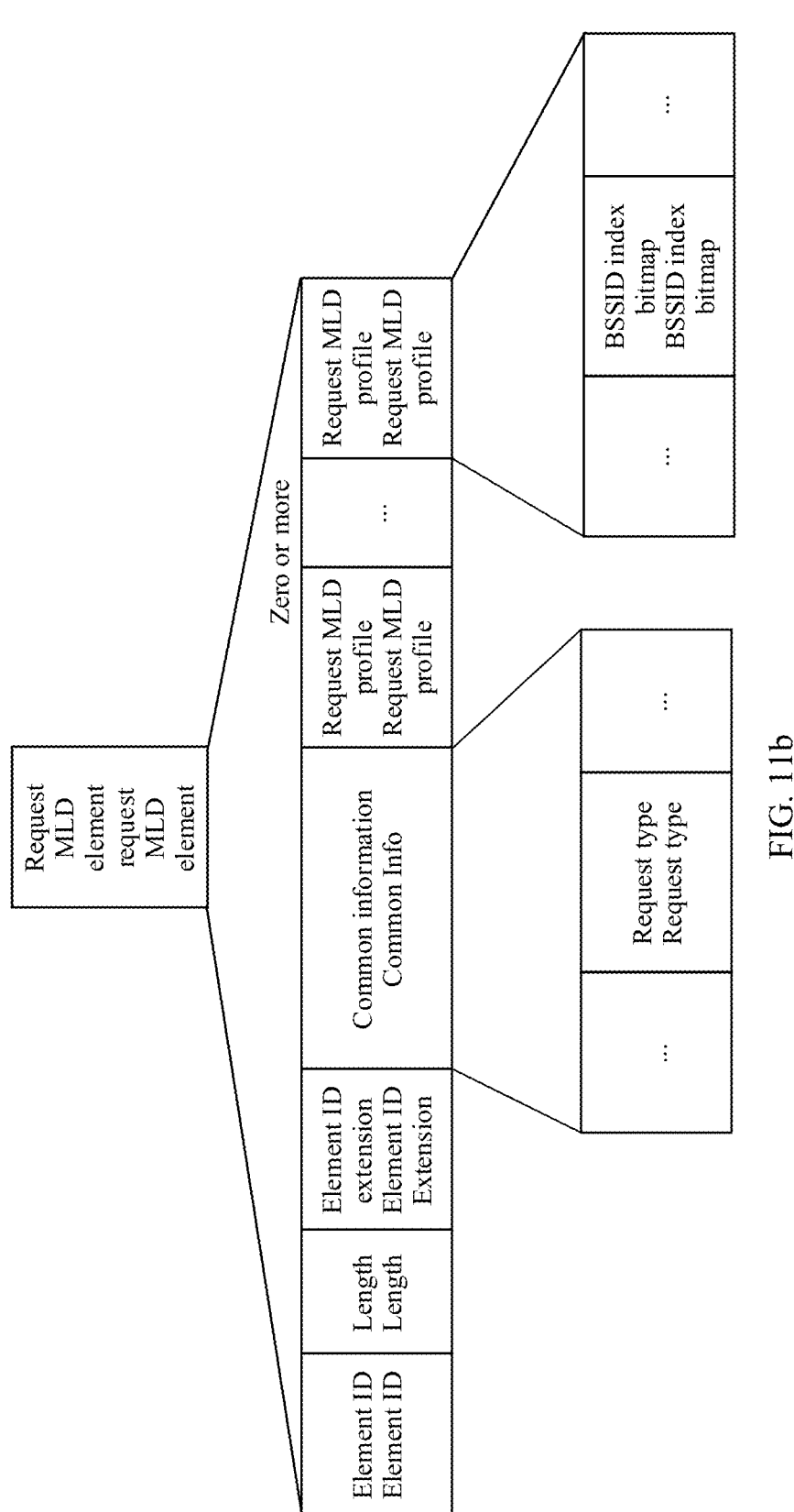

FIG. 11b is a schematic diagram of another structure of a request MLD element. The structure of the request MLD element is similar to the structure of the request MLD element provided in FIG. 11a, and a difference lies in that:

Specifically, "request the MLD configuration" includes a "BSSID index bitmap" field. Each bit in the bitmap corresponds to one AP MLD, and a bit is set to 0 or 1 to indicate whether to request a corresponding AP MLD. For example, a bit is set to 1 to indicate requesting an AP to feed back a communication parameter that is of the AP MLD and that corresponds to the bit. In an implementation, the "request MLD configuration" indicates requested communication parameters of different AP MLDs. In this case, the "request type field" may alternatively not exist.

It should be understood that, in this embodiment of this application, it is not excluded that the "requested MLD configuration" and the "request type field" in the foregoing two request MLD elements are combined to indicate communication parameters of different AP MLDs.

The request MLD element in FIG. 11a and FIG. 11b may further carry a link profile subelement field or a link profile element field.

The link profile subelement or the link profile element carries a communication parameter of an AP. Alternatively, the link profile subelement or the link profile element carries a communication parameter of a link.

In this embodiment of this application, the link profile subelement or the link profile element carried in the probe request frame indicates the communication parameter of the AP or the link that requests an AP MLD. The link profile subelement or the link profile element carried in the probe response frame is used to carry the communication parameter of the AP of the AP MLD or the link.

When the request MLD element does not carry the link profile subelement or the link profile element, it indicates, by default, that communication parameters of all APs or all links in the entire AP MLD are requested or responded to.

Alternatively, when the request MLD element carries a requested link indicated by the "link profile subelement", a field may be used to indicate whether to request all links or one link of the AP MLD corresponding to the "MLD address or MLD identifier". The field may be 1 bit. For example, if the 1 bit is set to 1, it indicates that all links of a corresponding AP MLD are known. If the 1 bit is set to 0, it indicates that a link is known. The link may be agreed on according to a protocol.

FIG. 11b is merely an example. In a standard formulation or technology evolution process, a name of the requested MLD element or a field included in the requested MLD element may alternatively be implemented in another manner. This is not limited in this embodiment of this application.

(3) The following describes a specific implementation of a signaling structure of a known MLD element. The known MLD element may be used in the foregoing Embodiment 1 and Embodiment 2.

In this embodiment, one or more known MLD elements are carried in a probe request frame sent by a non-AP STA, to request a communication parameter of an AP MLD.

Figure 12A:
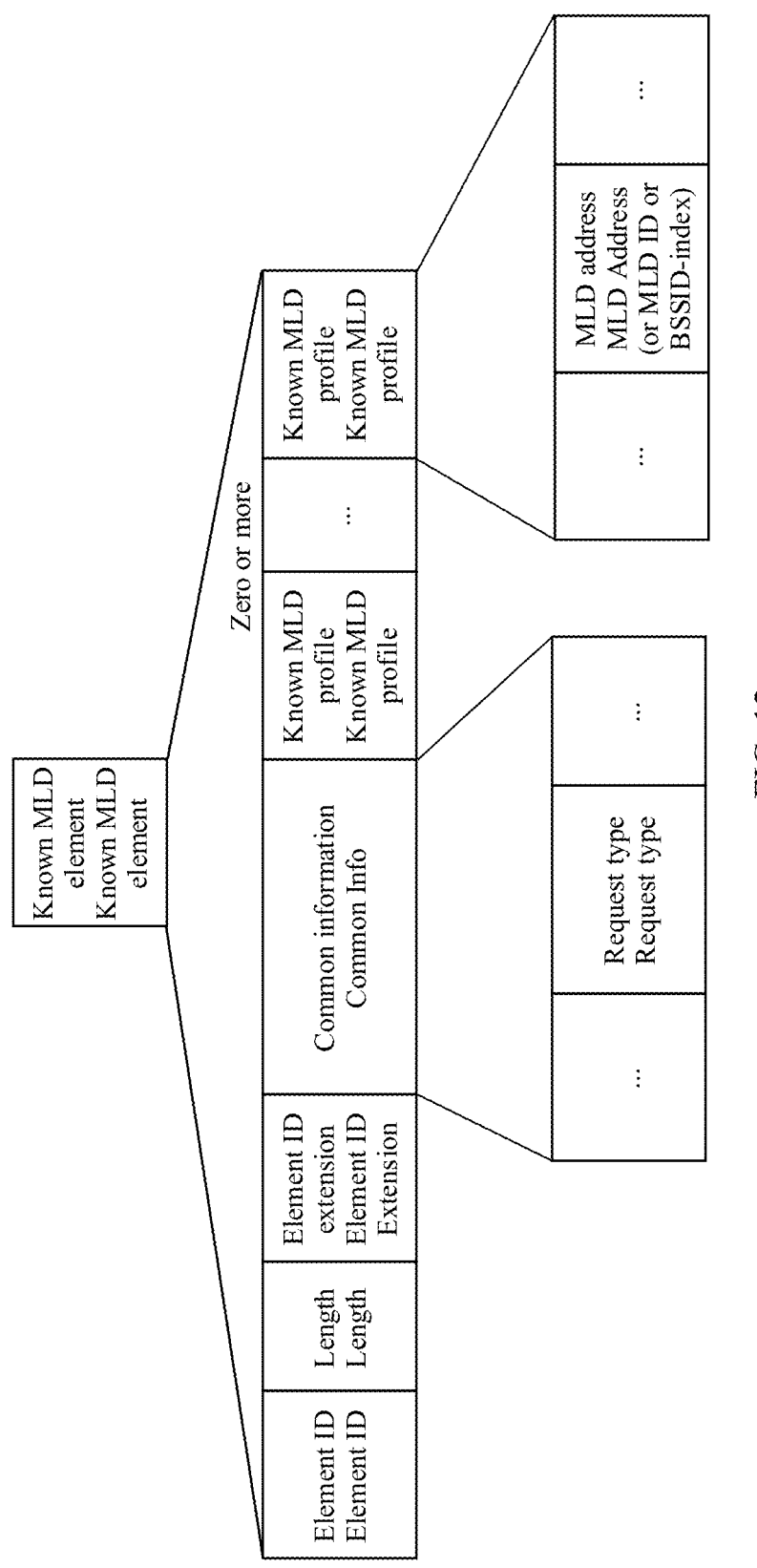
FIG. 12a to FIG. 12c are schematic diagrams of structures of known MLD element according to an embodiment of this application.

FIG. 12a shows a structure of a known MLD element. The known MLD element includes fields such as "element ID", "length", "element ID extension", "common information", and "known MLD configuration", where the "common information" field optionally further includes a "request type" subfield. The "known MLD configuration" subfield may exist or not exist. When the "known MLD configuration" subfield exists, an "MLD address" field is included.

The "MLD address" may also be equivalent to an "MLD identifier", and the MLD identifier indicates one or more MLDs. Herein, the "MLD address" and the "MLD identifier" may be an MLD MAC address, an MLD index, an MLD ID, or a BSSID index. Same as the request type of the requested MLD element described in (2), a request type of the known MLD element may also use one to three bits to indicate to request communication parameters of different AP MLDs. For details, refer to the description in (2), and details are not described herein again.

A difference from (2) is that the known MLD profile carries a communication parameter of an AP MLD that is already known by the non-AP STA, and a second AP does not need to carry a corresponding communication parameter in the probe response frame. In other words, the second AP carries, in the probe response frame, the communication parameter of the known AP MLD indicated by removing the MLD address of the known MLD profile from the AP MLD requested in the request type.

In this embodiment, an example in which the request type field is carried in a common information field of the known MLD element is used for description. In another implementation, the request type field may be further carried in another field, for example, a control field. Details are not described herein.

In another implementation, the common information field of the known MLD element may not include the "request type", but uses one or more "known MLD configurations" to indicate that an AP responsible for responding to the probe request frame is requested to reply with a communication parameter of another AP MLD other than a corresponding AP MLD corresponding to the "MLD address".

Figure 12B:
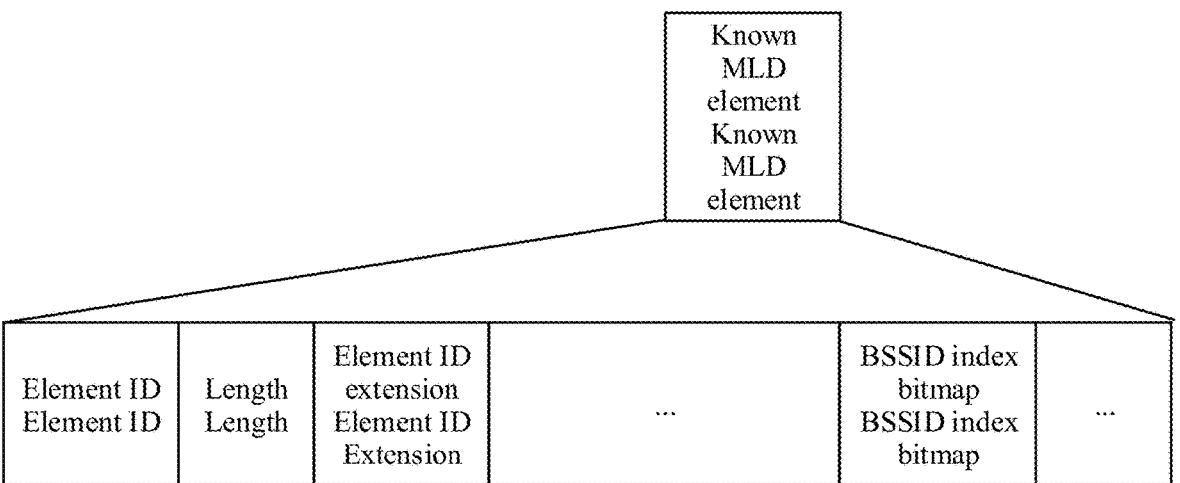

FIG. 12b shows a structure of another known MLD element. The known MLD element includes fields such as "element ID", "length", "element ID extension", and "BSSID index bitmap". The "BSSID identifier bitmap" indicates a status of a communication parameter of an AP MLD known by the non-AP STA that initiates the probe request frame. The AP responsible for sending the probe response frame replies with communication parameters of AP MLDs other than the known AP MLD indicated by the BSSID index bitmap in all AP MLDs.

The "all AP MLDs" in the foregoing implementation may be a known or agreed AP MLD in which another AP in an MBSSID set that belongs to a same MBSSID as the AP is located, and/or an AP MLD in which another AP collocated with the AP is located.

Figure 12C:
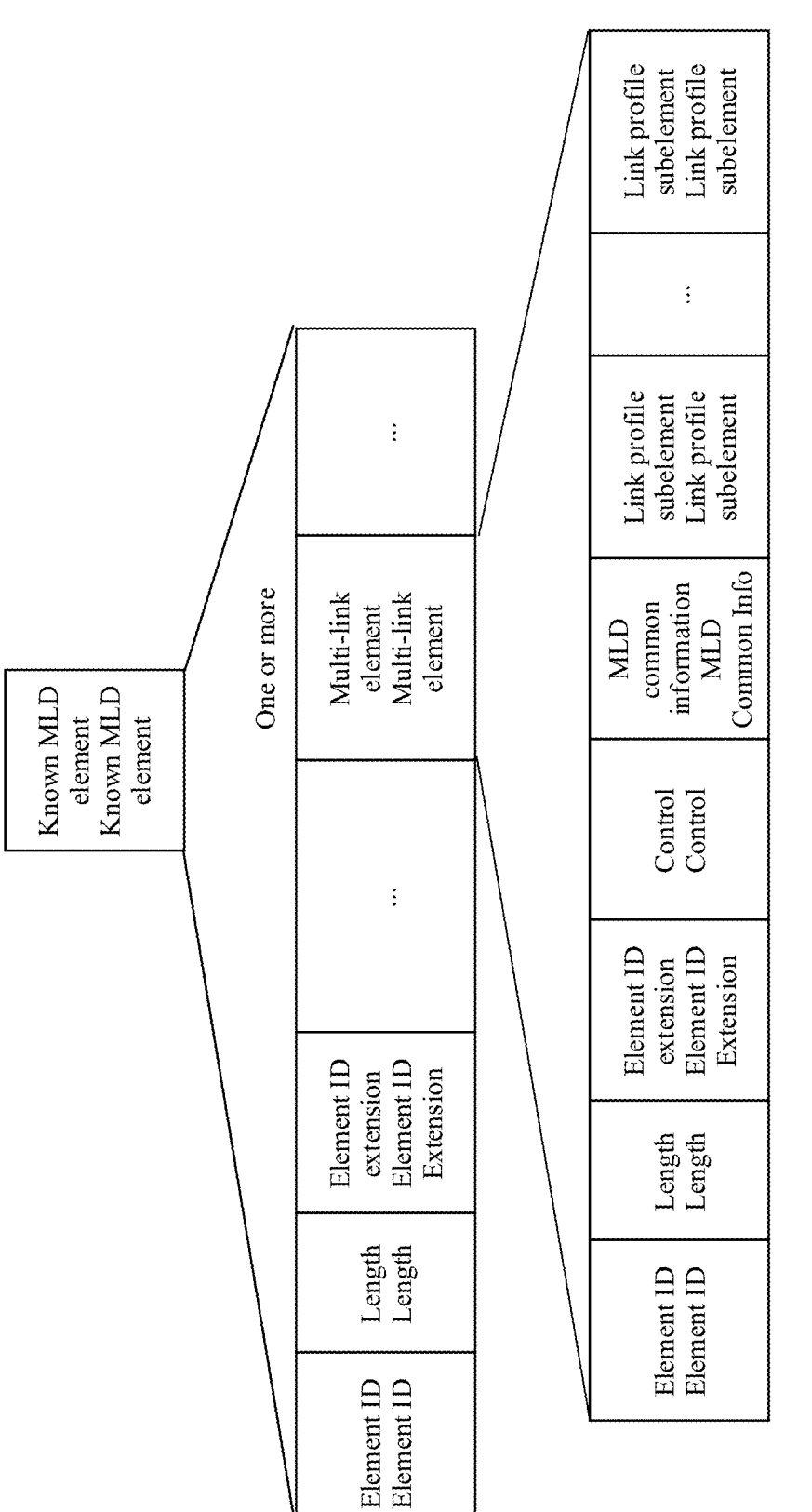

FIG. 12c shows a structure of another known MLD element. The known MLD element includes fields such as "element ID", "length", "element ID extension", and "multilink element". The "multilink element" carries "MLD common information" and "link profile subelement". The "MLD common information" may carry "MLD address or MLD identifier", and the "link profile subelement" indicates a known link in a plurality of links in the AP MLD corresponding to the "MLD address or MLD identifier".

The AP that responds to the probe request frame replies with a communication parameter of another link other than the AP MLD corresponding to the "MLD address or MLD identifier" and other than the known links indicated by the "link profile subelement".

A manner of a known link indicated by the "link profile subelement" may be carrying an identifier or an index number of the known link, or may be carrying a link index bitmap, used to indicate which links are known.

The "link profile subelement" indicates a manner of a known link. Alternatively, a field may be used to indicate whether all links of the AP MLD corresponding to the "MLD address or MLD identifier" or one link is known. The field may be 1 bit. For example, if the 1 bit is set to 1, it indicates that all links of a corresponding AP MLD are known. If the 1 bit is set to 0, it indicates that a link is known. The link may be agreed on according to a protocol.

In this embodiment, the "link profile subelement" may be directly carried in the known MLD element, or may be carried in the known MLD element by using a multi-link element.

The multi-link element, known MLD element and the request MLD element described in the foregoing embodiment may be combined depending on a situation, and carried in the probe request frame to implement different functions of detecting communication parameters of the plurality of links of the AP MLD and the AP MLD.

The following describes an implementation of the probe response frame.

In Embodiment 1, regardless of whether the non-AP STA sends the probe request frame in the implicit indication manner or the explicit indication manner, if the logical AP receiving the probe request frame is configured as the nontransmitted BSSID, a probe response frame is replied by using another transmitted BSSID AP that belongs to the same MSSID set.

Figure 10:
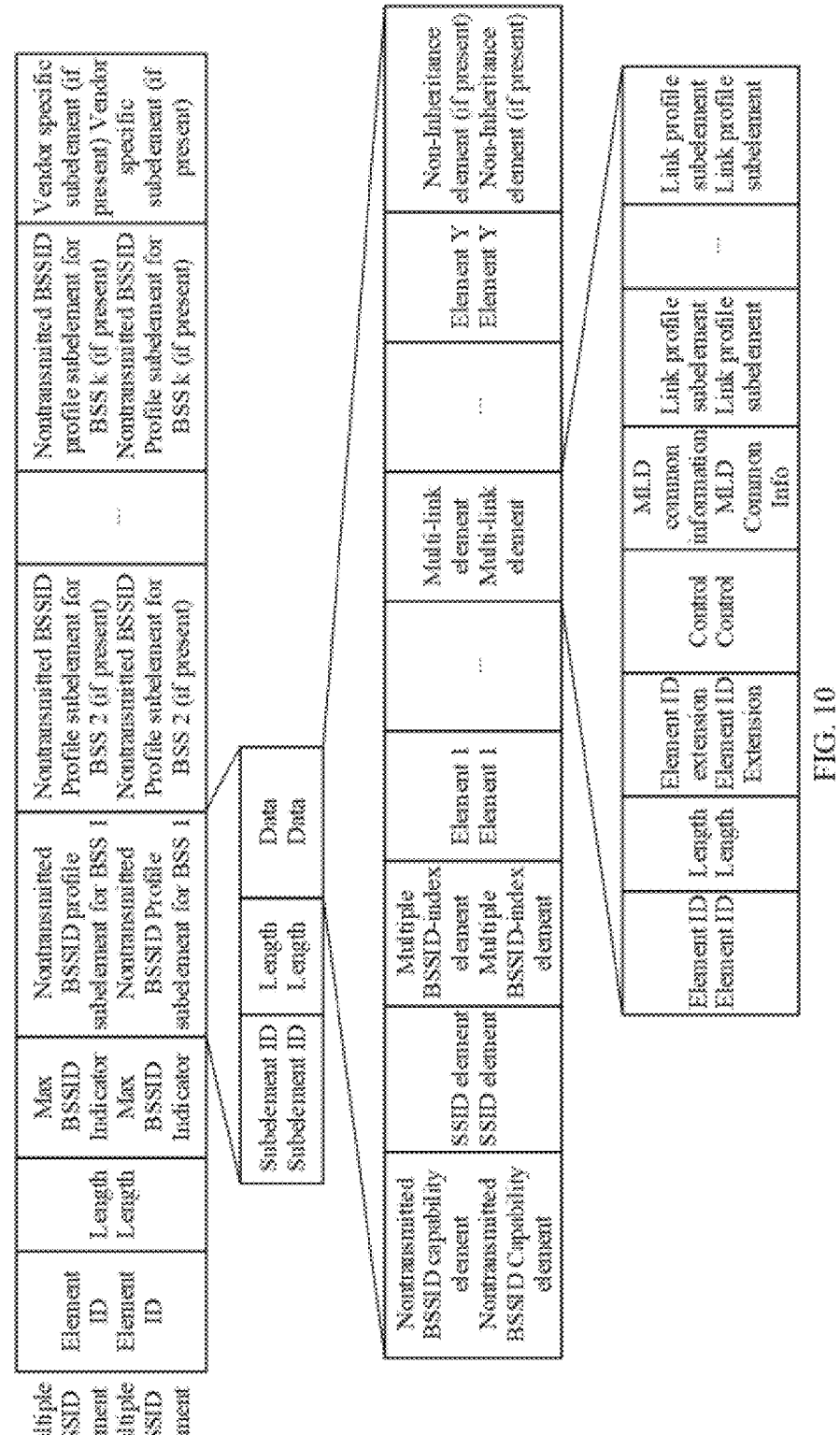
FIG. 10 is a schematic structural diagram of a multiple BSSID element according to an embodiment of this application.

When replying with the probe response frame to the non-AP STA, the transmitted BSSID AP carries information about the nontransmitted BSSID AP in the multiple BSSID element of the probe response frame. As shown in FIG. 10, the transmitted BSSID AP carries, in the multiple BSSID element, a nontransmitted BSSID profile corresponding to the nontransmitted BSSID AP, to carry a communication parameter of the nontransmitted BSSID AP, and carries, in the multi-link element included in the nontransmitted BSSID profile corresponding to the nontransmitted BSSID AP, a communication parameter of another AP in the AP MLD in which the nontransmitted BSSID AP is located. Specifically, the communication parameter of the another AP is carried in a link profile subelement. There may be a plurality of link profile subelements, to correspond to communication parameters of a plurality of APs.

For example, as shown in FIG. 4, the AP 11 carries, in the probe response frame replied to the non-AP STA, the communication parameters of the plurality of links supported by the AP MLD 2. Specifically, the communication parameters may be carried in the multiple BSSID element, that is, the multiple BSSID element carries the nontransmitted BSSID profile corresponding to the AP 12 to carry the information about the AP 12. The multi-link element is carried in the nontransmitted BSSID profile corresponding to the AP 12 to carry the information about the AP 22.

Correspondingly, in Embodiment 2, regardless of whether the non-AP STA sends the probe request frame in the implicit indication manner or the explicit indication manner, if the logical AP receiving the probe request frame is the transmitted BSSID AP, the logical AP may directly reply with the probe response frame to the non-AP STA.

When replying with the probe response frame to the non-AP STA, the transmitted BSSID AP may carry the information about the nontransmitted BSSID AP in the multiple BSSID element of the probe response frame.

As shown in FIG. 10, the transmitted BSSID AP carries, in the multiple BSSID element, a nontransmitted BSSID profile corresponding to the nontransmitted BSSID AP, to carry a communication parameter of the nontransmitted BSSID AP, and carries, in the multi-link element included in the nontransmitted BSSID profile corresponding to the nontransmitted BSSID AP, a communication parameter of another AP in the AP MLD in which the nontransmitted BSSID AP is located.

For example, as shown in FIG. 4, the AP 21 is the transmitted BSSID AP, and after the AP 21 receives the probe request frame, the AP21 carries, in the probe response frame replied to the non-AP STA, communication parameters of one or more links supported by one or more AP MLDs in the AP MLD 1, the AP MLD 2, and the AP MLD 3 in which the AP 21 is located, that is, communication parameters of one or more APs in the AP MLD 1, the AP MLD 2, and the AP MLD 3.

Specifically, when the probe request frame requests the communication parameter of the AP MLD 1 in which the AP 21 is located, the communication parameter of the AP MLD 1 is carried in the multi-link element in the probe response frame. Specifically, communication parameters of the AP 11, the AP 21, and the AP 31 may be separately carried in three link profile subelements in the multi-link element.

When the AP MLD requested by the probe request frame further includes communication parameters of the AP MLD 2 and/or the AP MLD 3, the communication parameters of the AP MLD 2 and the AP MLD 3 may be carried in the multiple BSSID element in the probe response frame. To be specific, two nontransmitted BSSID profiles corresponding to the AP 21 are carried in the multiple BSSID element to respectively carry communication parameters of the AP 22 and the AP 23. The link profile subelement of the multi-link element is carried in the nontransmitted BSSID profile corresponding to the AP 22 to carry information about the AP 12. The link profile subelement of the multi-link element is carried in the nontransmitted BSSID profile corresponding to the AP 23 to carry a communication parameter of the AP 33.

Figure 13:
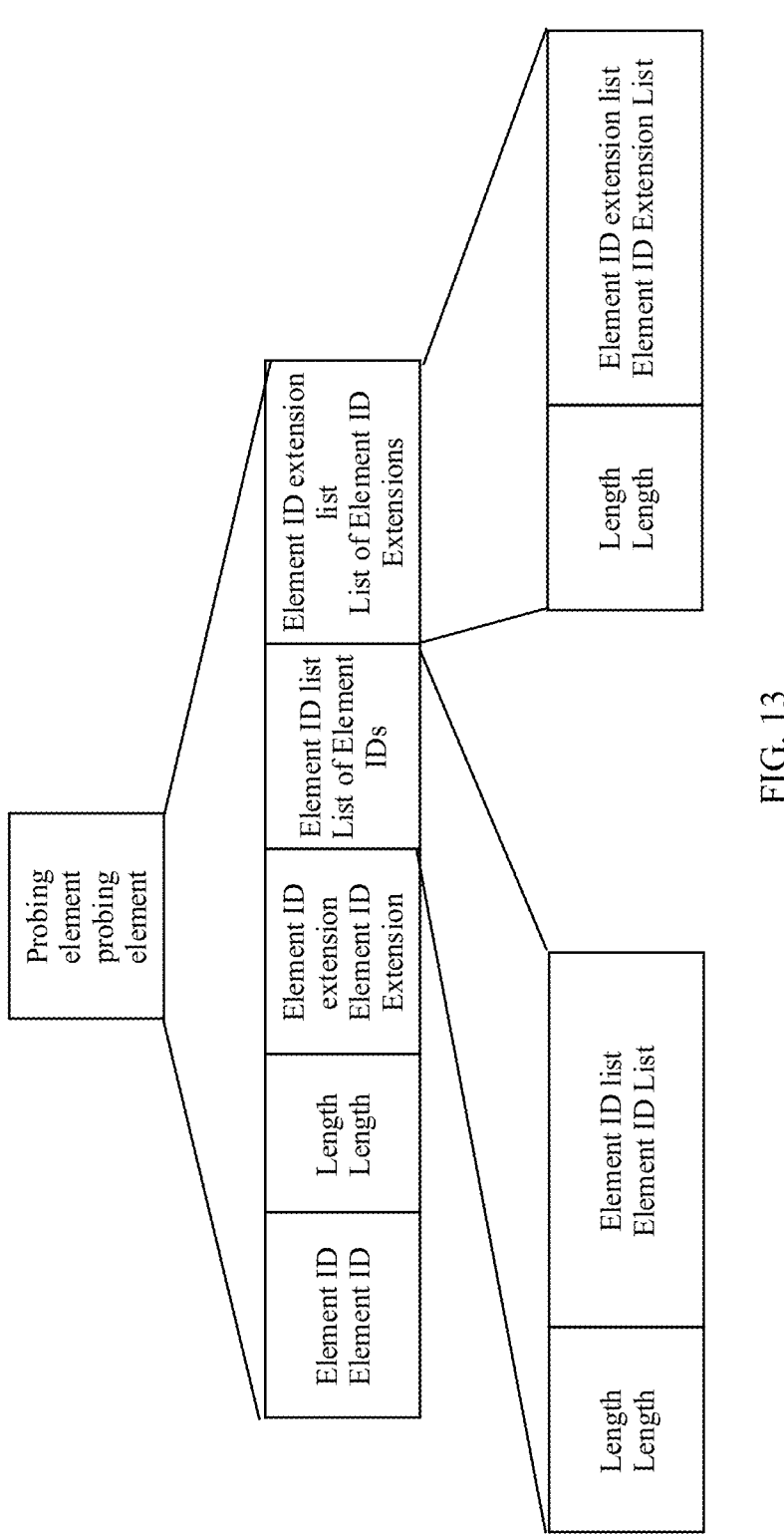
FIG. 13 is a schematic diagram of a structure a probing element according to an embodiment of this application.

In various implementations of Embodiment 1, Embodiment 2, and Embodiment 3, when the non-AP MLD does not need to obtain a complete communication parameter of the AP in the AP MLD, but needs to obtain only some information elements of the AP, the non-AP MLD may carry an identifier list of an information element in the probe request frame, to request the AP MLD to reply with content of a corresponding information element. As shown in FIG. 13, the information element identifier list is carried by using a probing element, for example, a "list of element IDs (list of element IDs)". Each element ID corresponds to a requested information element. In still another implementation, the non-AP STA may directly carry a non-inheritance element in the probe request to carry some requested information elements.

Correspondingly, if the probe response frame includes communication parameters of a plurality of APs, a communication parameter of each AP includes content of an information element corresponding to an element ID carried in the list of element IDs.

Alternatively, in the probe request frame, each AP carries an identifier list of an information element, and information elements of different communication parameters may be requested for different APs. In this case, the probe response frame carries an information element of a communication parameter corresponding to each AP.

The information element described in this embodiment is partial information of the communication parameter of the AP described above.

According to this embodiment, some communication parameters of the AP can be flexibly requested, thereby reducing request and feedback overheads.

The following describes in detail an apparatus provided in embodiments of this application.

In embodiments of this application, the access point AP (for example, an AP in an AP multi-link device) or the station may be divided into function modules based on the foregoing method examples. For example, the functional modules may be obtained through division based on corresponding functions, or two or more functions may be integrated into one processing module. The integrated module may be implemented in a form of hardware, or may be implemented in a form of a software functional module. It should be noted that, in the embodiments of this application, division into the modules is an example, and is merely logical function division. In an actual implementation, another division manner may be used.

Figure 14:
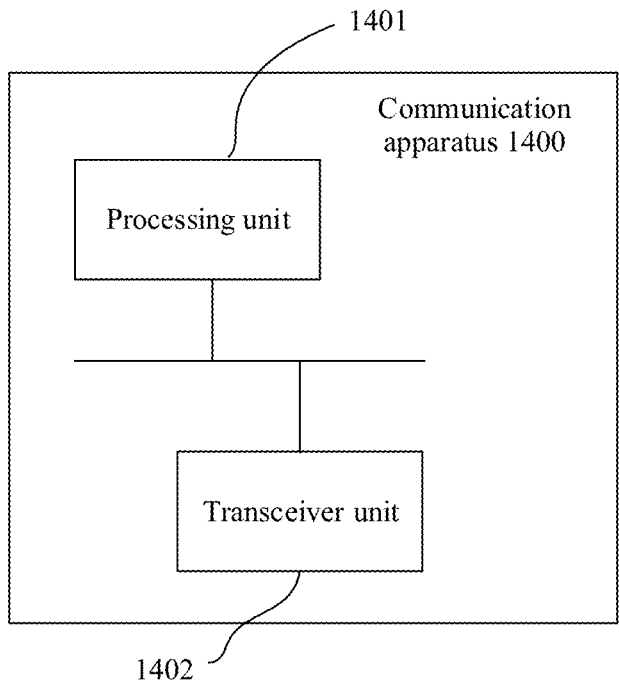
FIG. 14 is a schematic diagram of a structure of a communication apparatus according to an embodiment of this application.

When an integrated unit is used, FIG. 14 is a possible schematic diagram of a structure of a communication apparatus 1400. The communication apparatus 1400 may be a multi-link device, or a chip or a processing system in a multi-link device. The communication apparatus 1400 may perform operations of the multi-link device in the foregoing method embodiments. The communication apparatus 1400 includes a processing unit 1401 and a transceiver unit 1402.

For example, the communication apparatus 1400 is the foregoing access point AP (for example, an AP in an AP multi-link device) or the station.

For example, the communication apparatus 1400 is the access point or a chip in the access point.

The processing unit 1401 may be configured to control and manage an action of the communication apparatus 1400. For example, a probe request frame is generated. For another example, an operation of the transceiver unit 1402 is controlled. Optionally, if the communication apparatus 1400 includes a storage unit, the processing unit 1401 may further execute a program or instructions stored in the storage unit, so that the communication apparatus 1400 implements the method and functions in any one of the foregoing embodiments.

For example, the processing unit 1401 may control the transceiver unit to perform step S101 in FIG. 5, S201 in FIG. 6, or another process of the technology described in this specification. All related content of the steps in the foregoing method embodiments may be cited in function descriptions of the corresponding functional modules. Details are not described herein again.

For example, the processing unit 1401 may control the transceiver unit to perform step S102 in FIG. 5, S202 in FIG. 6, or another process of the technology described in this specification. All related content of the steps in the foregoing method embodiments may be cited in function descriptions of the corresponding functional modules. Details are not described herein again.

For example, the transceiver unit 1402 may send and receive data or signaling transmitted on one link, or may send and receive data or signaling transmitted on a plurality of links. Optionally, the transceiver unit 1402 may be one transceiver module, or may include a plurality of transceiver modules. When the transceiver unit 1402 is one transceiver module, the transceiver module may send and receive data on a plurality of links. For example, if a first multi-link device operates on two links, when the transceiver unit 1402 includes two transceiver modules, one of the transceiver modules operates on one link, and the other transceiver module operates on the other link. For example, the transceiver unit 1402 may be configured to perform step S101 in FIG. 5, step S201 in FIG. 6, or another process of the technology described in this specification. All related content of the steps in the foregoing method embodiments may be cited in function descriptions of the corresponding functional modules. Details are not described herein again.

Figure 15:
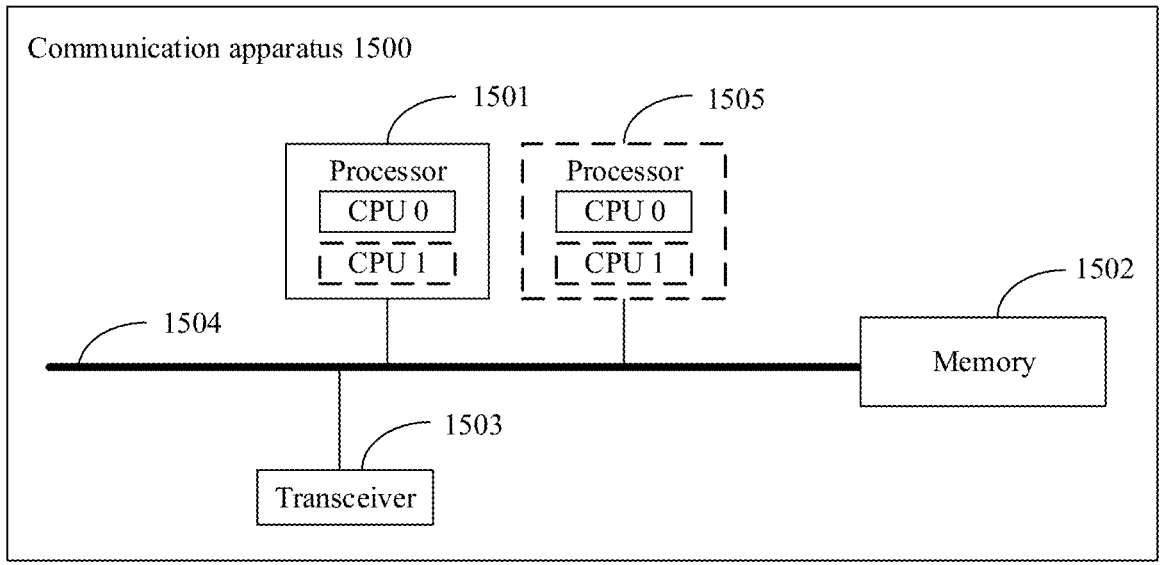
FIG. 15 is a schematic diagram of a structure of another communication apparatus according to an embodiment of this application.

For example, the communication apparatus 1400 may be the communication apparatus shown in FIG. 15, the processing unit 1401 may be the processor 1501 in FIG. 15, and the transceiver unit 1402 may be the transceiver 1503 in FIG. 15. Optionally, the communication apparatus 1400 may further include a memory. The memory is configured to store corresponding program code and data that are for the communication apparatus 1400 to perform any one of the foregoing communication methods between multi-link devices. Descriptions of all related content of the components in FIG. 15 may be cited in function description of corresponding components of the communication apparatus 1400, and details are not described herein again.

For example, the communication apparatus 1400 may alternatively be a chip or a processor, the processing unit 1401 is a processing circuit in the chip or the processor, the transceiver unit 1402 may be an input/output circuit in the chip or the processor, the input/output circuit is an interface for mutual communication or data exchange between the chip or the processor and another coupled component. It can be ensured that signaling or data information or program instructions are input to the chip or the processor for processing, processed data or signaling is output to the another coupled component, and the first multi-link device in which the chip or the processor is installed is controlled to implement functions.

For another example, the communication apparatus 1400 is the foregoing station or the chip in the foregoing station.

The processing unit 1401 may be configured to control and manage an action of the communication apparatus 1400. For example, a probe request frame or a probe response frame is generated. For another example, an operation of the transceiver unit 1402 is controlled. Optionally, if the communication apparatus 1400 includes a storage unit, the processing unit 1401 may further execute a program or instructions stored in the storage unit, so that the communication apparatus 1400 implements the method and functions in any one of the foregoing embodiments.

For example, the processing unit 1401 may be configured to generate a probe request frame or a probe response frame. All related content of the steps in the foregoing method embodiments may be cited in function descriptions of the corresponding function modules. Details are not described herein again.

For example, the transceiver unit 1402 may send and receive data or signaling transmitted on one link, or may send and receive data or signaling transmitted on a plurality of links. Optionally, the transceiver unit 1402 may be one transceiver module, or may include a plurality of transceiver modules. When the transceiver unit 1402 is one transceiver module, the transceiver module may send and receive data on a plurality of links. For example, if a first station operates on two links, when the transceiver unit 1402 includes two transceiver modules, one of the transceiver modules operates on one link, and the other transceiver module operates on the other link. All related content of the steps in the foregoing method embodiments may be cited in function descriptions of the corresponding functional modules. Details are not described herein again.

For example, the communication apparatus 1400 may be the communication apparatus shown in FIG. 15, the processing unit 1401 may be the processor 1501 in FIG. 15, and the transceiver unit 1402 may be the transceiver 1503 in FIG. 15. Optionally, the communication apparatus 1400 may further include a memory. The memory is configured to store program code and data that are for the communication apparatus 1400 to perform any one of the foregoing embodiments. Descriptions of all related content of the components in FIG. 15 may be cited in function description of corresponding components of the communication apparatus 1400, and details are not described herein again.

For example, the communication apparatus 1400 may alternatively be a chip or a processor, the processing unit 1401 is a processing circuit in the chip or the processor, the transceiver unit 1402 may be an input/output circuit in the chip or the processor, the input/output circuit is an interface for mutual communication or data exchange between the chip or the processor and another coupled component. It can be ensured that signaling or data information or program instructions are input to the chip or the processor for processing, processed data or signaling is output to the another coupled component, and the first multi-link device in which the chip or the processor is installed is controlled to implement functions.

It should be noted that, in the apparatus embodiment part, for structures of the probe request frame and the probe response frame, refer to descriptions in the foregoing embodiments. Details are not described herein again.

FIG. 15 shows a communication apparatus 1500 according to an embodiment of this application. The apparatus may be an access point AP (for example, an AP in an AP multi-link device) or a station in the foregoing embodiments, or may be an access point AP (for example, an AP in an AP multi-link device) or a chip or a processing system in a station, and can implement a method and a function in any embodiment of this application. Due to a difference between integration degrees, the communication apparatus may include one or more of the components shown in FIG. 15. The components shown in FIG. 15 may include at least one processor 1501, a memory 1502, a transceiver 1503, and a communication bus 1504.

The following describes each composition component of the communication apparatus 1500 in detail with reference to FIG. 15.

The processor 1501 is a control center of the communication apparatus 1500, and may be one processor or may be a collective term of a plurality of processing elements. For example, the processor 1501 is a central processing unit (CPU), an application-specific integrated circuit (Application Specific Integrated Circuit, ASIC), or one or more integrated circuits configured to implement embodiments of this application, for example, one or more microprocessors (digital signal processor, DSP), or one or more field programmable gate arrays (FPGA). The processor 1501 may implement various functions of the communication device by running or executing a software program stored in the memory 1502 and invoking data stored in the memory 1502. During specific implementation, in an embodiment, the processor 1501 may include one or more CPUs, for example, a CPU 0 and a CPU 1 shown in FIG. 15.

During specific implementation, in an embodiment, the communication apparatus 1500 may include a plurality of processors, for example, the processor 1501 and a processor 1505 shown in FIG. 15. Each of the processors may be a single-core processor (single-CPU) or may be a multi-core processor (multi-CPU). The processor herein may be one or more communication devices, circuits, and/or processing cores configured to process data (for example, computer program instructions).

The memory 1502 may be a read-only memory (ROM) or another type of static storage communication device that can store static information and instructions; or a random access memory (RAM) or another type of dynamic storage communication device that can store information and instructions. The memory may alternatively be an electrically erasable programmable read-only memory (EEPROM), a compact disc read-only memory (CD-ROM) or another compact disc storage, an optical disc storage (including a compact disc, a laser disc, an optical disc, a digital versatile disc, a Blu-ray disc, or the like), a magnetic disk storage medium or another magnetic storage communication device, or any other medium that can be used to carry or store expected program code in a form of instructions or a data structure and that is accessible by a computer, but is not limited thereto. The memory 1502 may exist independently, or may be connected to the processor 1501 by using the communication bus 1504. Alternatively, the memory 1502 may be integrated with the processor 1501. The memory 1502 is configured to store a software program for executing the solution of this application, and the processor 1501 controls execution of the software program.

The transceiver 1503 is configured to communicate with another device (for example, the station STA 102 or the STA 202 in the embodiment shown in FIG. 1). Certainly, the transceiver 1503 may be further configured to communicate with a communication network, for example, the Ethernet, a radio access network (RAN), or a wireless local area network (WLAN). The transceiver 1503 may include a receiving unit to implement a receiving function, and a transmitting unit to implement a transmitting function.

The communication bus 1504 may be an industry standard architecture (ISA) bus, a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 15, but this does not mean that there is only one bus or only one type of bus.

For example, the communication apparatus 1500 is a complete device. The communication apparatus may include a processor 1501, a memory 1502, a transceiver 1503, and a communication bus 1504. Optionally, the communication apparatus may further include another component, for example, a display.

Optionally, the communication apparatus 1500 is an access point AP (for example, an AP in an AP multi-link device), and may be configured to implement the methods and functions related to the AP in the foregoing embodiments. For example, the memory stores a computer program (instructions). When the processor invokes the computer program, the foregoing method and function are implemented. For example, the processor is configured to generate a probe response frame, and the transceiver is configured to receive the probe request frame and send a probe response frame. For example, the processor is configured to control the transceiver to perform step S102. Certainly, a process of generating the probe response frame in step S102 may also be completed by the processor. For another example, the processor is configured to control the transceiver to perform step S202. Certainly, a process of generating the probe response frame in step S202 may also be completed by the processor.

In still another implementation, the communication apparatus 1500 is a station, and may be configured to implement the method and the function of the station in the foregoing embodiments. For example, the memory stores a computer program. When the processor invokes the computer program, the foregoing method and function are implemented.

For example, the processor is configured to generate signaling or a frame (for example, a probe request frame), and the transceiver is configured to send the signaling or the frame (for example, send a probe request frame and receive a probe response frame). For example, the processor is configured to control the transceiver to send the probe request frame in step S101, and then the processor determines a structure of a multi-AP multi-link device and information about each AP based on the probe response frame, and may further determine an AP to be associated with. For another example, for example, the processor is configured to control the transceiver to send the probe request frame in step S201 and control the transceiver to receive the probe response frame fed back by the AP in S202. Then the processor determines a structure of the multi-AP multi-link device and information about each AP based on the probe response frame, and further determines the AP to be associated with For another example, the communication apparatus 1500 is a chip system or a processing system in the access point AP, so that a device in which the chip system or the processing system is installed implements the method and the function related to the AP in the foregoing embodiments. In this case, the communication apparatus 1500 may include some components shown in FIG. 15. For example, the communication apparatus 1500 includes a processor. The processor may be coupled to a memory, invoke instructions in the memory, and execute the instructions, so that a device configured or installed with the chip system or the processing system implements the methods and the functions in the foregoing embodiments. Optionally, the memory may be a component in the chip system or the processing system, or may be a coupled/connected component outside the chip system or the processing system. For example, the chip system or the processing system is installed in the access point AP (for example, a reporting AP in an AP multi-link device), so that the access point AP may perform step S102 or step S202 in the foregoing embodiment.

For another example, the communication apparatus 1500 is a chip system or a processing system in a station, so that a device in which the chip system or the processing system is installed implements the method and the function related to the station in the foregoing embodiments. In this case, the communication apparatus 1500 may include some components shown in FIG. 15. For example, the communication apparatus 1500 includes a processor. The processor may be coupled to a memory, invoke instructions in the memory, and execute the instructions, so that a device configured or installed with the chip system or the processing system implements the methods and the functions in the foregoing embodiments. Optionally, the memory may be a component in the chip system or the processing system, or may be a coupled/connected component outside the chip system or the processing system. In an example, the chip system or the processing system is installed in the station, so that the station can perform step S101 or step S201 in the foregoing embodiment.

The chip system or processing system may support communication based on 802.11 series protocols, for example, 802.11be, 802.11ax, and 802.11ac. The chip system may be installed in devices in various scenarios that support WLAN transmission. The devices in the WLAN transmission scenarios are described at the beginning of this specification, and details are not described herein.

An embodiment of this application further provides a computer-readable storage medium. The computer-readable storage medium stores computer program code. When the foregoing processor executes the computer program code, an electronic device (for example, an AP or a station) in which the processor is located is enabled to perform the method in any embodiment.

An embodiment of this application further provides a computer program product. When the computer program product runs on a computer, the computer (for example, an AP or a station) is enabled to perform the method in any embodiment.

An embodiment of this application further provides a communication apparatus. The apparatus may exist in a product form of a chip. A structure of the apparatus includes a processor and an interface circuit. The processor is configured to communicate with another apparatus through a receiving circuit, to enable the apparatus to perform the method in any embodiment.

An embodiment of this application further provides a communication system. The communication system includes the foregoing access point AP (for example, an AP in an AP multi-link device) and a station. The access point AP (for example, a reporting AP in an AP multi-link device) and the station may perform the method in any one of the foregoing embodiments (for example, the methods in FIG. 5 and FIG. 6). Method or algorithm steps described in combination with the content disclosed in this application may be implemented by hardware, or may be implemented by a processor by executing software instructions. The software instructions may include a corresponding software module. The software module may be stored in a random access memory (RAM), a flash memory, an erasable programmable read-only memory (Erasable Programmable ROM, EPROM), an electrically erasable programmable read-only memory (Electrically EPROM, EEPROM), a register, a hard disk, a removable hard disk, a compact disc read-only memory (CD-ROM), or any other form of storage medium well-known in the art. For example, a storage medium is coupled to a processor, so that the processor can read information from the storage medium or write information into the storage medium. Certainly, the storage medium may be a component of the processor. The processor and the storage medium may be disposed in an ASIC. In addition, the ASIC may be located in a core network interface device. Certainly, the processor and the storage medium may exist in the core network interface device as discrete components.

A person skilled in the art should be aware that in the foregoing one or more examples, functions described in this application may be implemented by hardware, software, firmware, or any combination thereof. When the functions are implemented by software, the foregoing functions may be stored in a computer-readable medium or transmitted as one or more instructions or code in a computer-readable medium. The computer-readable medium includes a computer-readable storage medium and a communication medium. The communication medium includes any medium that facilitates transmission of a computer program from one place to another. The storage medium may be any available medium accessible to a general-purpose or a special-purpose computer.

In the foregoing specific implementations, the objectives, technical solutions, and beneficial effects of this application are further described in detail. It should be understood that the foregoing descriptions are merely specific implementations of this application, but are not intended to limit the protection scope of this application. Any modification, equivalent replacement, improvement, or the like made based on the technical solutions of this application shall fall within the protection scope of this application.

The invention claimed is:

1. A first access point (AP) in a wireless local area network (WLAN), comprising:

at least one processor; and at least one memory storing at least one program that is executable by the at least one processor, the at least one program including instructions to:

receive a probe request frame, wherein the probe request frame requests the first AP to feed back a communication parameter that is of an AP multi-link device (MLD) and that is related to the first AP, wherein the AP MLD being related to the first AP comprises the AP MLD comprising another AP belonging to a same multiple transmitted basic service set identifier (MBSSID) set as the first AP, the first AP is a transmitted basic service set identifier (BSSID) AP, and the communication parameter of the AP MLD comprises communication parameters of a plurality of links supported by the AP MLD, and wherein the probe request frame carries first lists of identifiers of first information elements, each first list of identifiers of first information elements corresponds to an AP in the AP MLD, and requests content of the first information elements of the corresponding AP in the AP MLD; and send a probe response frame, wherein the probe response frame carries the communication parameter that is of the AP MLD and that is related to the first AP.

2. The first access point according to claim 1, wherein the probe request frame carries first indication information, and the first indication information indicates to the first AP to feed back the communication parameter that is of the AP MLD and that is related to the first AP.

3. The first access point according to claim 2, wherein the communication parameter that is of the AP MLD and that is related to the first AP further comprises at least one of following:

a communication parameter of another AP MLD related to the first AP, the first AP being located in the AP MLD related to the first AP;

or a communication parameter of another AP MLD in which another AP collocated with the first AP is located.

4. The first access point according to claim 2, wherein the first indication information is carried in the probe request frame, the first indication information comprises an MLD identifier or an MLD address, and the MLD identifier or the MLD address indicates to the first AP to feed back a communication parameter of an AP MLD corresponding to the MLD identifier or the MLD address.

5. The first access point according to claim 1, wherein the probe request frame further carries a second list of identifiers of second information elements, requesting to acquire the second information elements of each requested AP in the AP MLD.

6. The first access point according to claim 5, wherein the probe response frame comprises communication parameters of a plurality of APs in the AP MLD, and a communication parameter of each AP in the plurality of APs comprises content of a second information element corresponding to an identifier of the second list of identifiers carried in the probe request frame.

7. The first access point according to claim 1, wherein the probe response frame comprises an information element of a communication parameter corresponding to each corresponding AP in the AP MLD.

8. The first access point according to claim 1, wherein the first lists of identifiers of the first information elements are carried in a multi-link element of the probe request frame.

9. A method comprising:

receiving, by a first access point (AP) in a wireless local area network (WLAN), a probe request frame, wherein the probe request frame requests the first AP to feed back a communication parameter that is of an AP multi-link device (MLD) and that is related to the first AP, wherein the AP MLD being related to the first AP comprises the AP MLD comprising another AP belonging to a same multiple transmitted basic service set identifier (MBSSID) set as the first AP, the first AP is a transmitted basic service set identifier (BSSID) AP, and the communication parameter of the AP MLD comprises communication parameters of a plurality of links supported by the AP MLD, and wherein the probe request frame carries first lists of identifiers of first information elements, each first list of identifiers of first information elements corresponding to an AP in the AP MLD, to request content of the first information elements of the corresponding AP in the AP MLD; and sending, by the first AP, a probe response frame, wherein the probe response frame carries the communication parameter that is of the AP MLD and that is related to the first AP.

10. The method according to claim 9, wherein the probe request frame carries first indication information, and the first indication information indicates to the first AP to feed back the communication parameter that is of the AP MLD and that is related to the first AP.

11. The method according to claim 10, wherein the communication parameter that is of the AP MLD and that is related to the first AP comprises at least one of following:

a communication parameter of another AP MLD related to the first AP, the first AP being located in the AP MLD related to the first AP;

or a communication parameter of another AP MLD in which another AP collocated with the first AP is located.

12. The method according to claim 10, wherein the first indication information is carried in the probe request frame, the first indication information comprises an MLD identifier or an MLD address, and the MLD identifier or the MLD address indicates to the first AP to feed back the communication parameter of an AP MLD corresponding to the MLD identifier or the MLD address.

13. The method according to claim 9, wherein the probe request frame further carries a second list of identifiers of second information elements, requesting to acquire the second information elements of each requested AP in the AP MLD.

14. The method according to claim 13, wherein the probe response frame comprises communication parameters of a plurality of APs in the AP MLD, and a communication parameter of each AP in the plurality of APs comprises content of a second information element corresponding to an identifier of the second list of identifiers carried in the probe request frame.

15. The method according to claim 9, wherein the probe response frame comprises an information element of a communication parameter corresponding to each corresponding AP in the AP MLD.

16. The method according to claim 9, wherein the first lists of identifiers of the first information elements are carried in a multi-link element of the probe request frame.

17. An access point station (AP STA) multi-link device (MLD), comprising at least one AP, wherein the at least one AP comprises a first AP, and the first AP comprises:

at least one processor; and at least one memory storing at least one program that is executable by the at least one processor, the at least one program including instructions to:

receive a probe request frame, wherein the probe request frame requests the first AP to feed back a communication parameter that is of the AP MLD and that is related to the first AP, wherein the AP MLD being related to the first AP comprises the AP MLD comprising another AP belonging to a same multiple transmitted basic service set identifier (MBSSID) set as the first AP, the first AP is a transmitted basic service set identifier (BSSID) AP, and the communication parameter of the AP MLD comprises communication parameters of a plurality of links supported by the AP MLD, and wherein the probe request frame carries first lists of identifiers of first information elements, each first list of identifiers of first information elements corresponds to an AP in the AP MLD, and requests content of the first information elements of the corresponding AP in the AP MLD; and send a probe response frame, wherein the probe response frame carries the communication parameter that is of the AP MLD and that is related to the first AP.

* * * * *